Jan. 18, 1944.    G. C. CHASE    2,339,616
CALCULATING MACHINE
Filed July 22, 1939    15 Sheets-Sheet 1

INVENTOR
George C. Chase
BY
Stuart Wilder  ATTORNEY

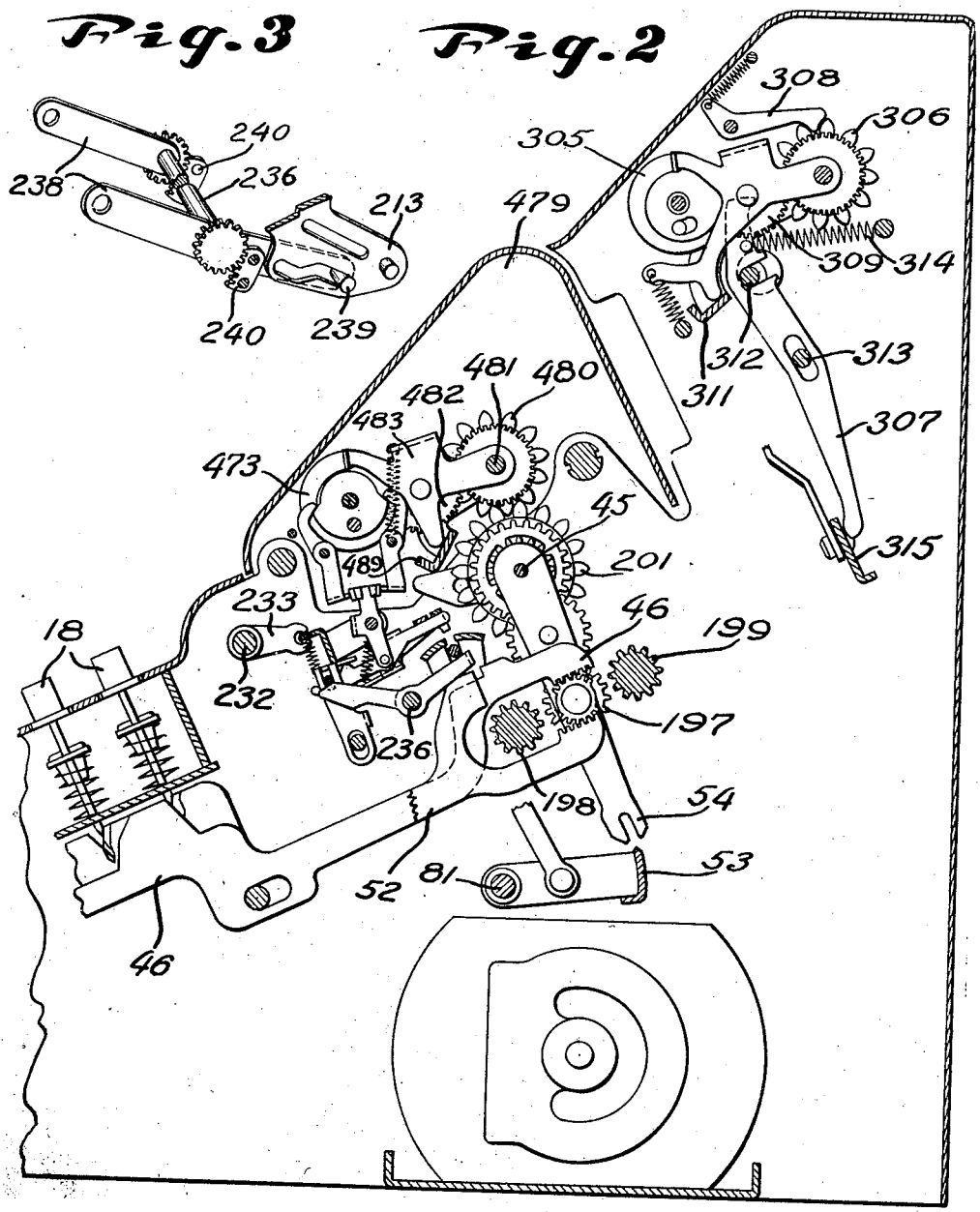

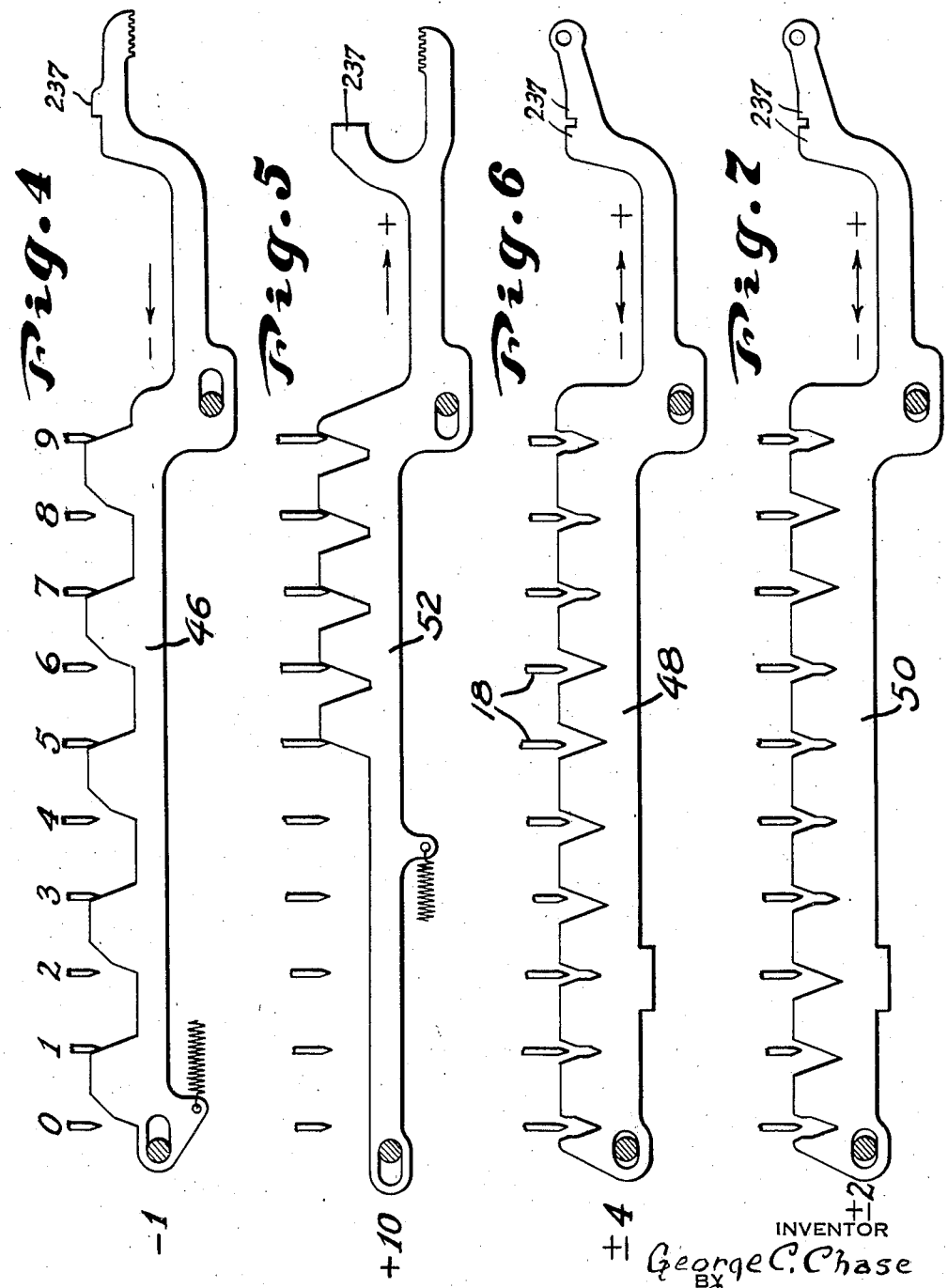

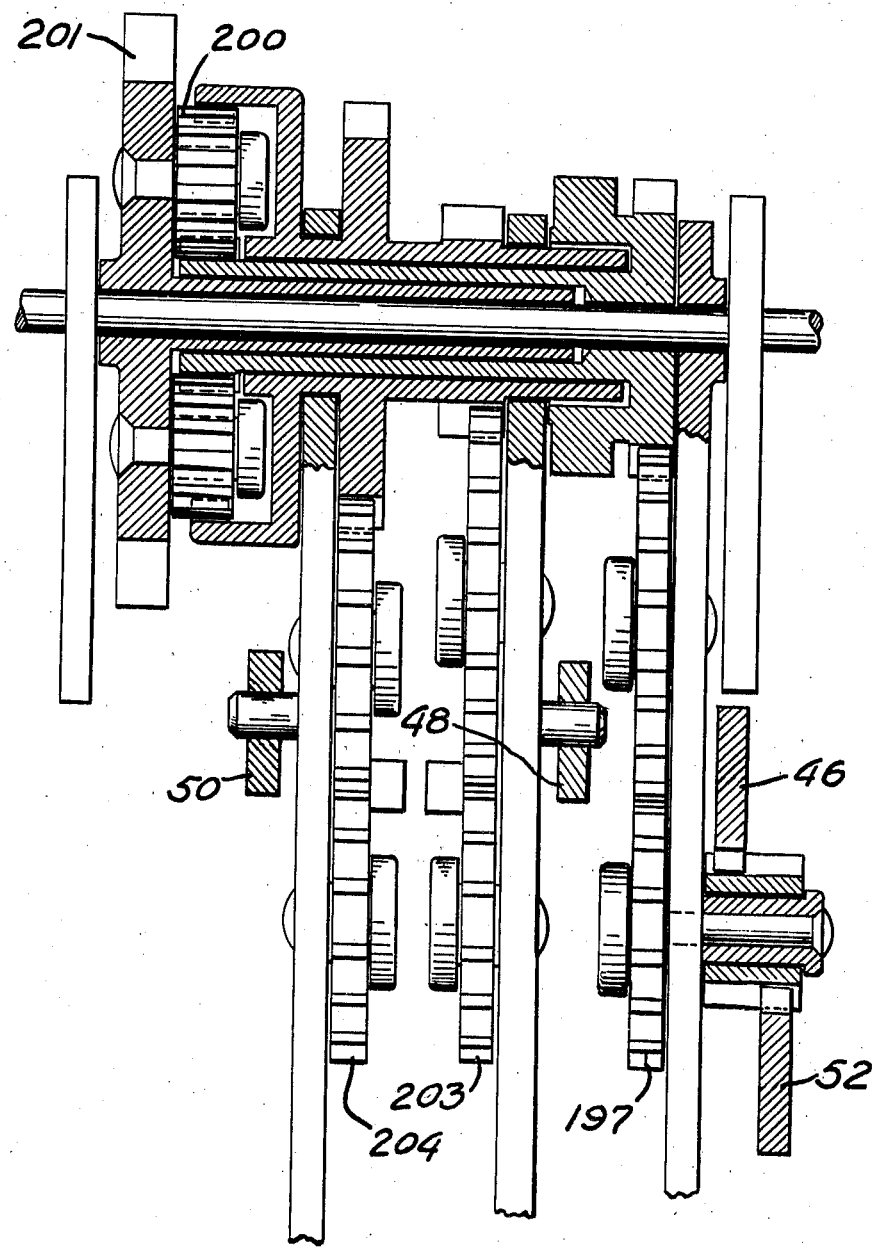

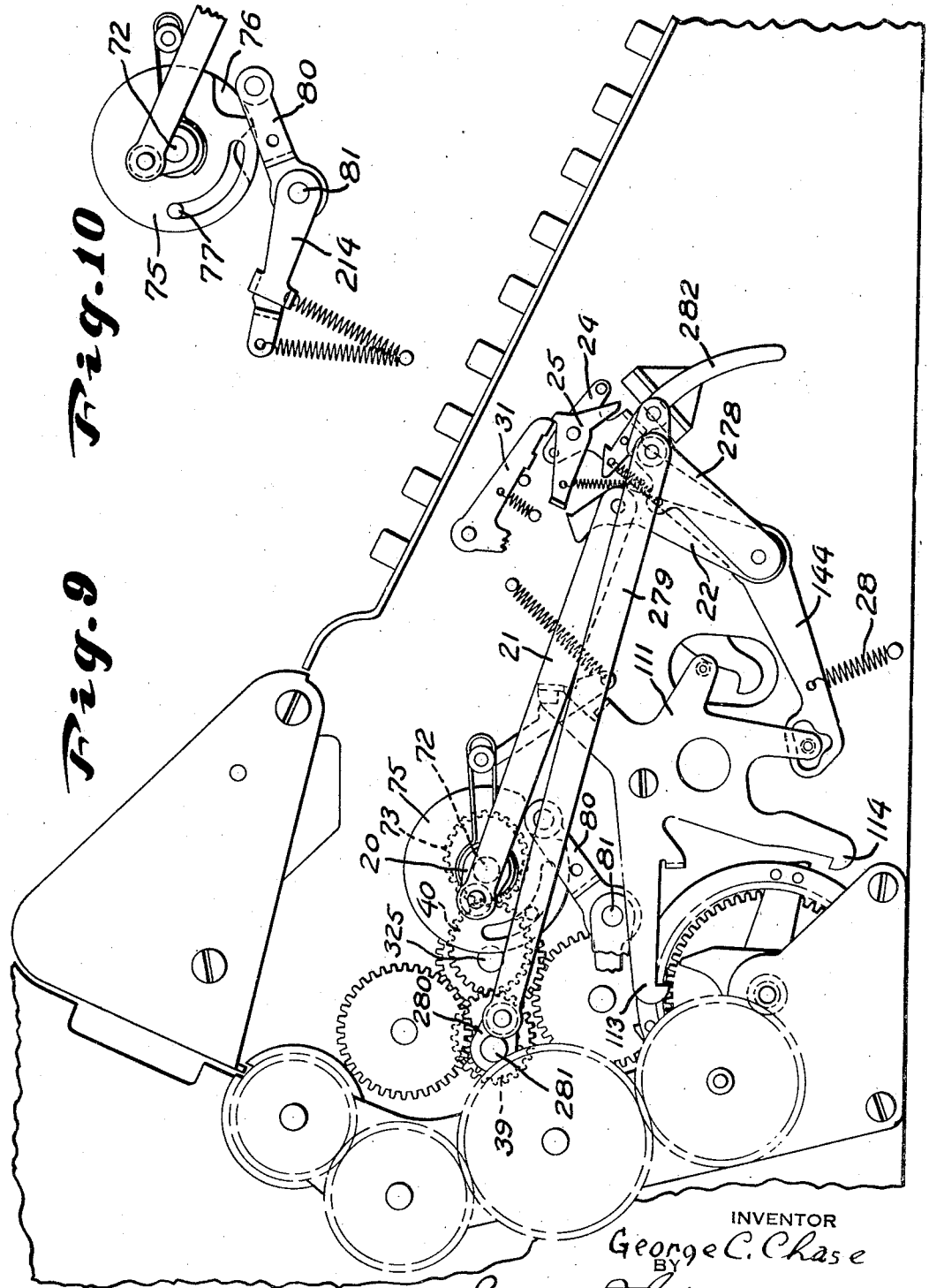

Jan. 18, 1944.                    G. C. CHASE                    2,339,616
                              CALCULATING MACHINE
                            Filed July 22, 1939              15 Sheets-Sheet 6
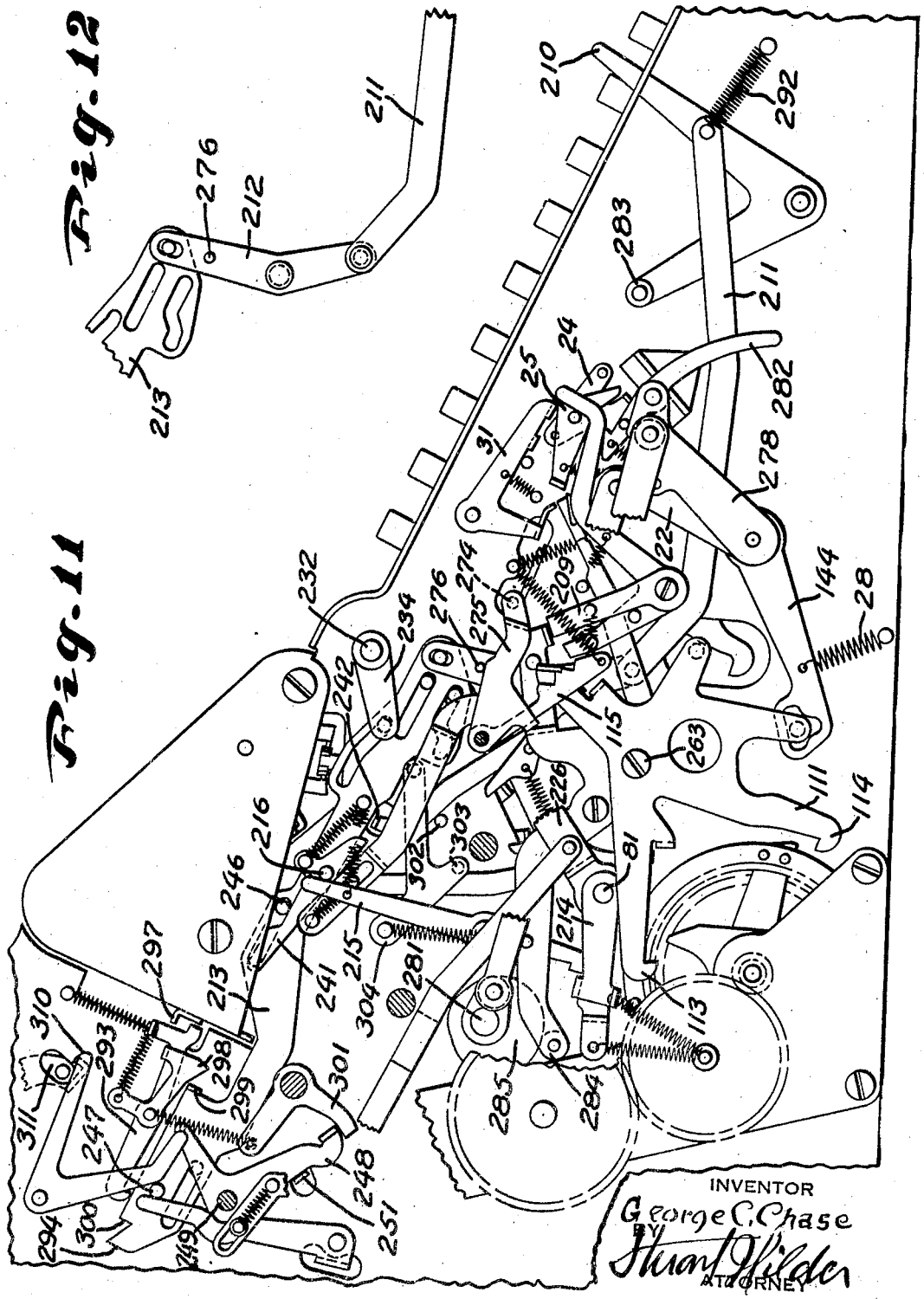

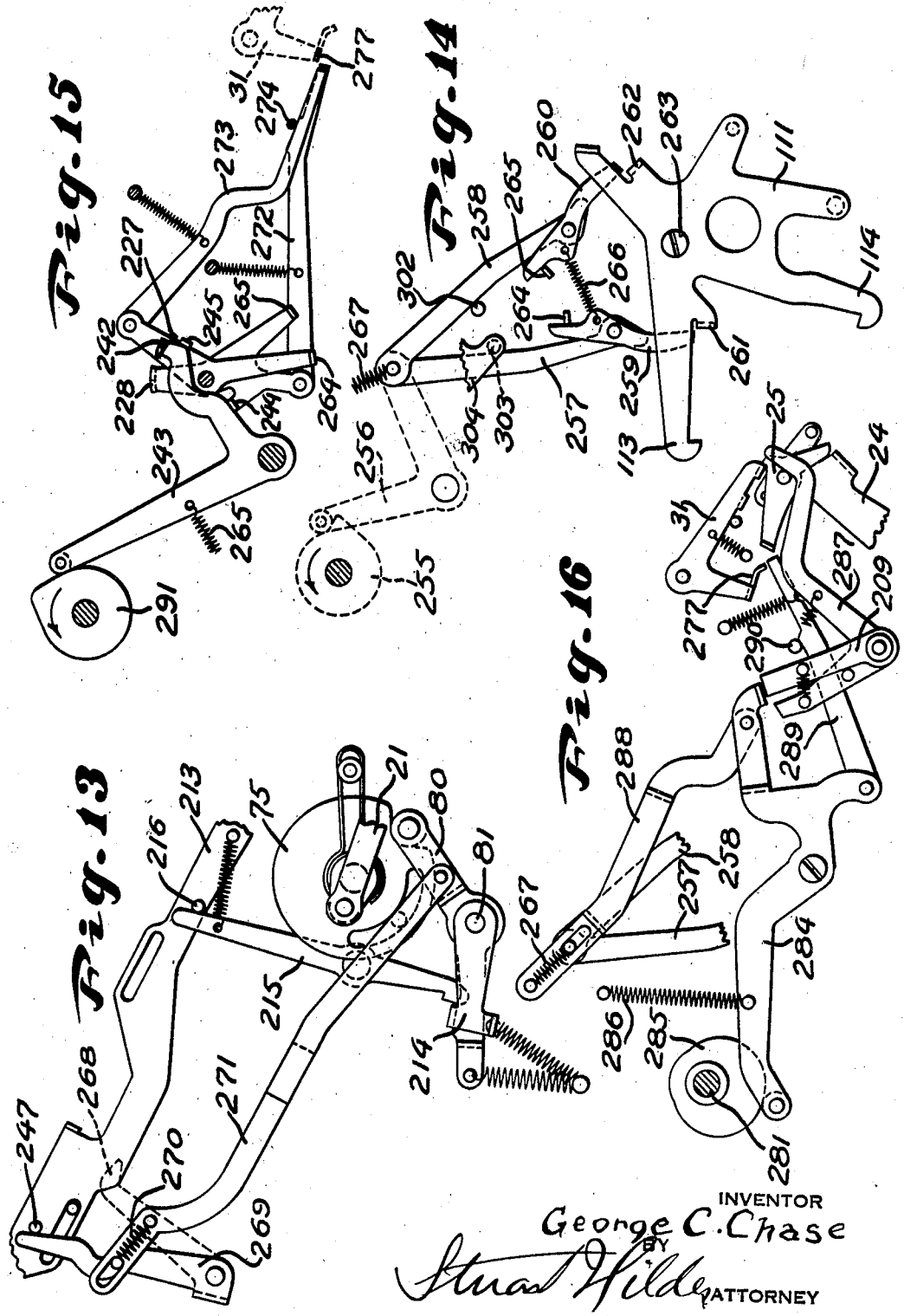

INVENTOR
George C. Chase
BY Stuart Wilde, ATTORNEY

Jan. 18, 1944.　　　G. C. CHASE　　　2,339,616
CALCULATING MACHINE
Filed July 22, 1939　　　15 Sheets-Sheet 9

INVENTOR
George C. Chase
BY Stuart Wilde, ATTORNEY

Jan. 18, 1944.   G. C. CHASE   2,339,616
CALCULATING MACHINE
Filed July 22, 1939   15 Sheets-Sheet 10
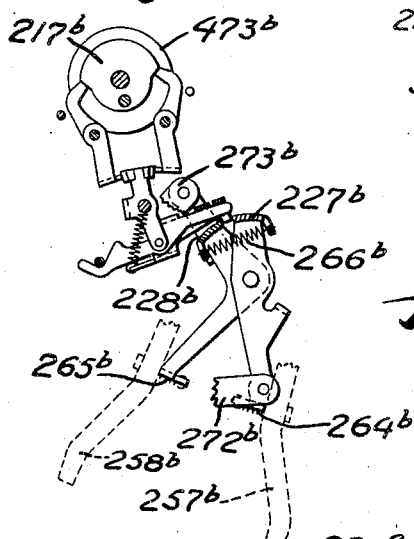
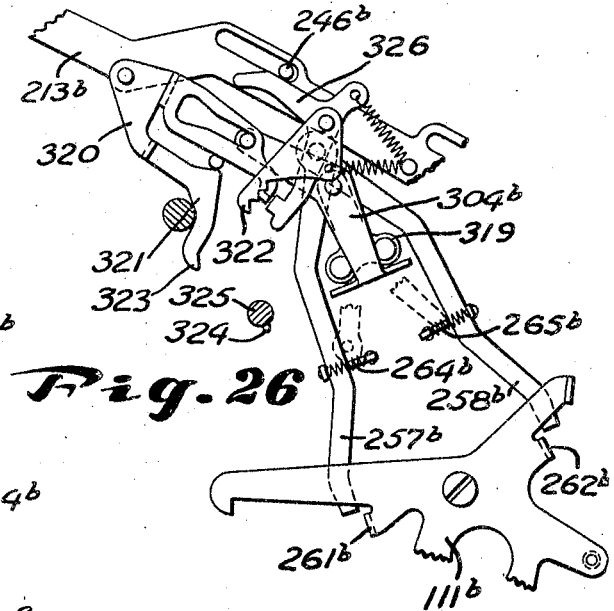
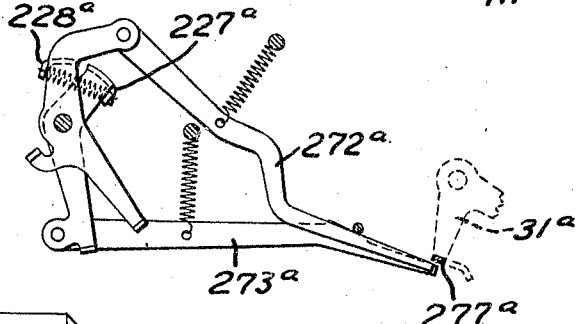
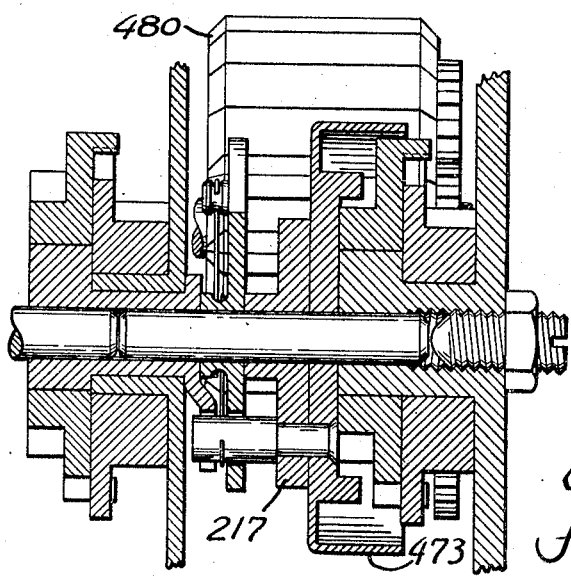
INVENTOR
George C. Chase
BY
ATTORNEY Jan. 18, 1944.  G. C. CHASE  2,339,616
CALCULATING MACHINE
Filed July 22, 1939  15 Sheets-Sheet 11
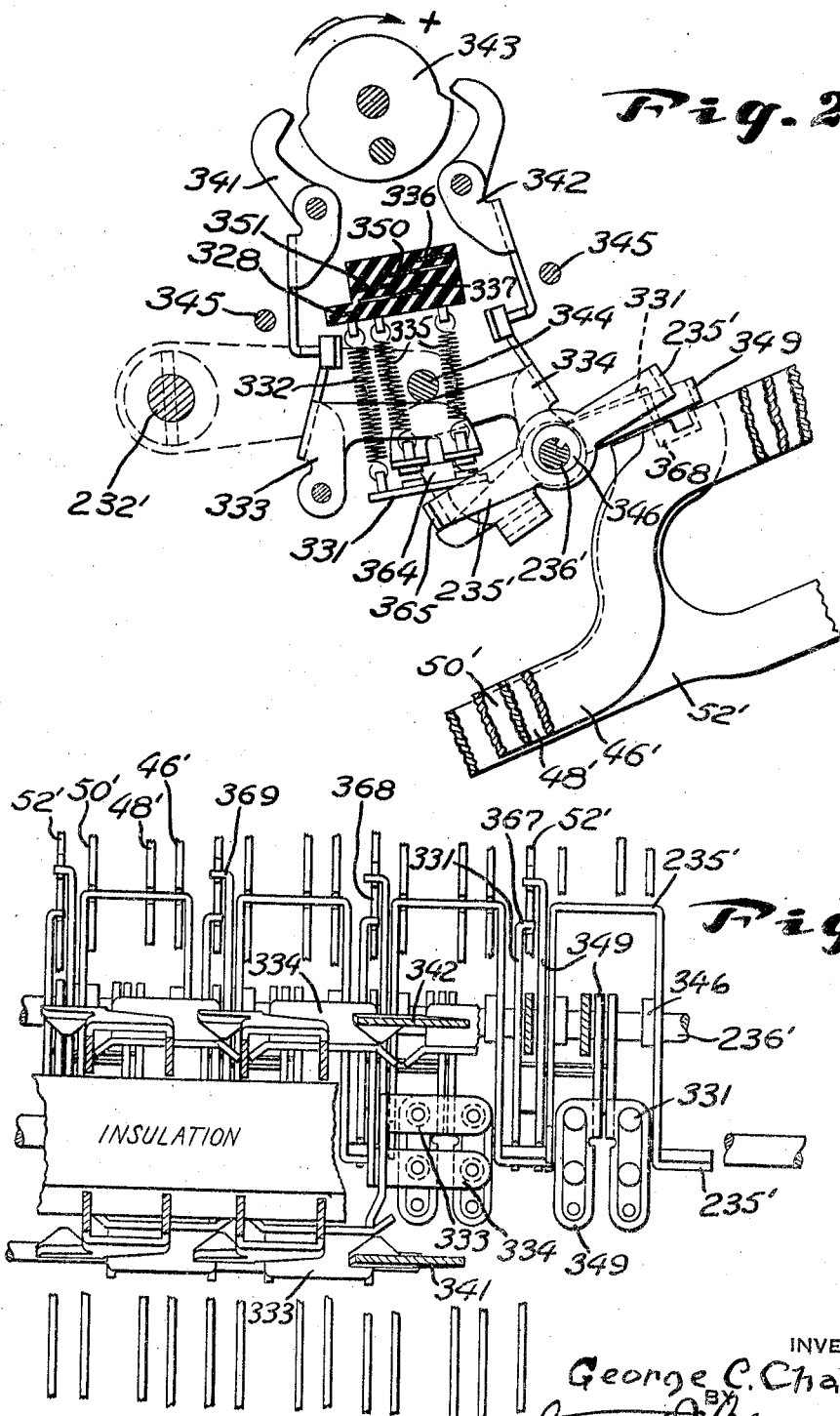
INVENTOR
George C. Chase
BY Stuart Wilde ATTORNEY Jan. 18, 1944. G. C. CHASE 2,339,616
CALCULATING MACHINE
Filed July 22, 1939 15 Sheets-Sheet 12

INVENTOR
George C. Chase
BY Stuart Wilder
ATTORNEY

Jan. 18, 1944. G. C. CHASE 2,339,616
CALCULATING MACHINE
Filed July 22, 1939 15 Sheets-Sheet 13

INVENTOR
George C. Chase
BY
Stuart Wilder ATTORNEY

Jan. 18, 1944.  G. C. CHASE  2,339,616
CALCULATING MACHINE
Filed July 22, 1939   15 Sheets-Sheet 14
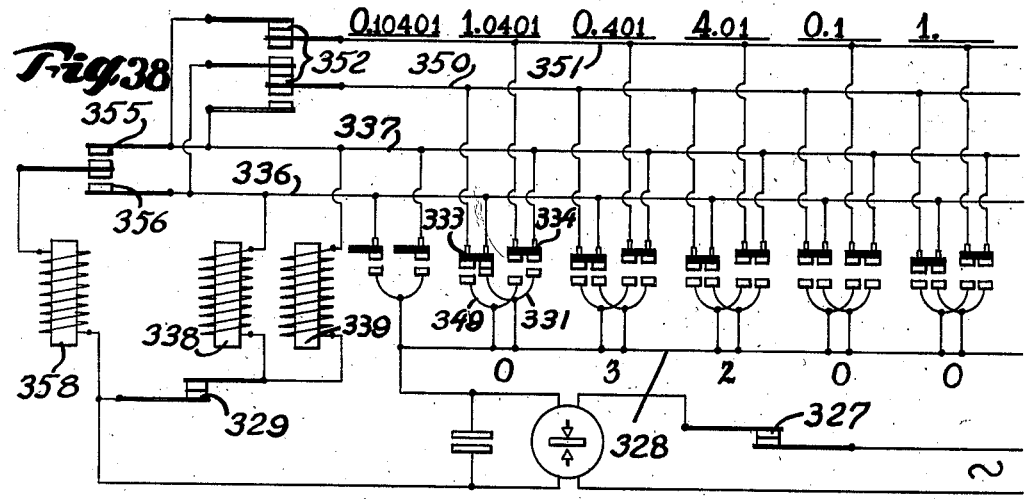
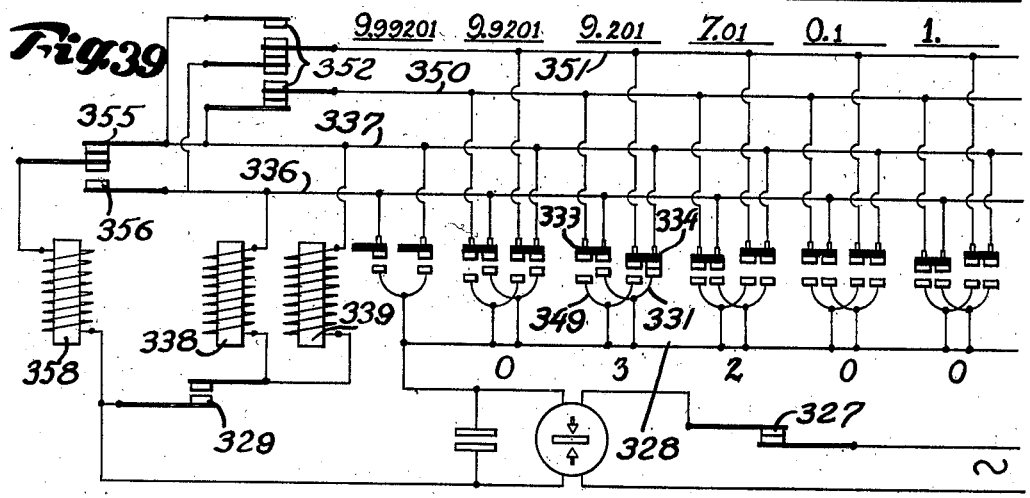
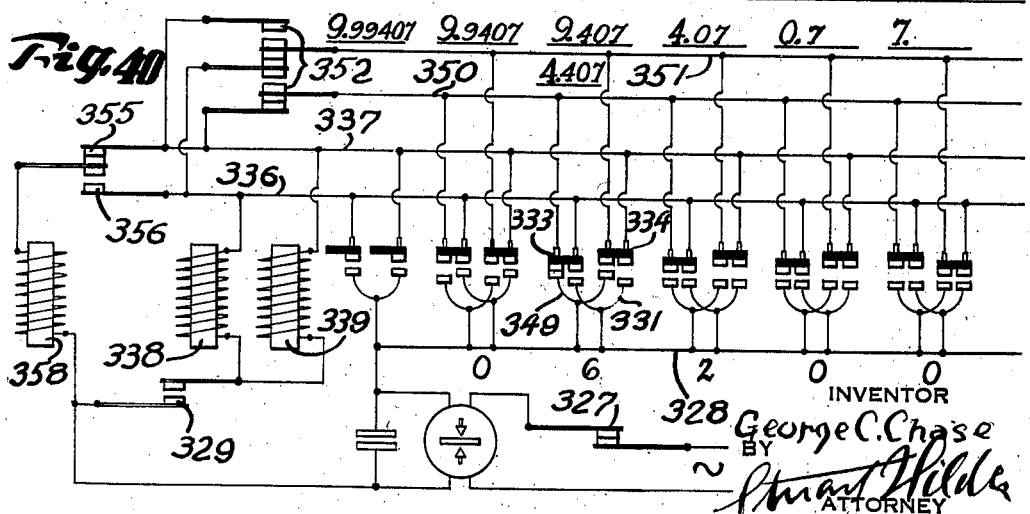
INVENTOR
George C. Chase
BY
ATTORNEY $$\frac{\$837,282.31}{92} = \$9,100.89\frac{43}{92}$$

| | | | | | | | | |
|---|---|---|---|---|---|---|---|---|
| DIVIDEND | 0.83+ | 8.37+ | 3.72+ | 7.28+ | 2.82+ | 8.23+ | 2.31+ | 3.1  1. |
| | −0.92 | +0.8 | −2. | | | | | |
| − 1 Cyc. | 9.91 | 9.17 | 1.72 | | | | | |
| | −0.46 | +0.4 | −1. | | | | | |
| − 1½ Cyc. | 9.45 | 9.57 | 0.72 | | | | | |
| | +0.46 | −0.4 | +1. | | | | | |
| − 1 Cyc. | 9.91 | 9.17 | 1.72 | 7.28 | | | | |
| →  | | +0.92 | −0.8 | +2. | | | | |
| + 1 Cyc. | | 0.09 | 0.92 | 9.28 | | | | |
| | | +0.46 | −0.4 | +1. | | | | |
| + 1½ Cyc. | | 0.55 | 0.52 | 0.28 | | | | |
| | | −0.46 | +0.4 | −1. | | | | |
| + 1 Cyc. | | 0.09 | 0.92 | 9.28 | 2.82 | | | |
| → | | | −0.92 | +0.8 | −2. | | | |
| − 1 Cyc. | | | 0.00 | 0.08 | 0.82 | | | |
| | | | −0.46 | +0.4 | −1. | | | |
| − 1½ Cyc. | | | 9.54 | 0.48 | 9.82 | | | |
| | | | +0.46 | −0.4 | +1. | | | |
| − 1 Cyc. | | | 0.00 | 0.08 | 0.82 | 8.23 | 2.31 | |
| → | | | | | | | | |
| 0 Cyc. | | | | | | | | |
| → | | | | | −0.92 | +0.8 | −2. | |
| − 1 Cyc. | | | | | 9.90 | 9.03 | 0.31 | |
| | | | | | −0.46 | +0.4 | −1. | |
| − 1½ Cyc. | | | | | 9.44 | 9.43 | 9.31 | |
| | | | | | +0.46 | −0.4 | +1. | |
| − 1 Cyc. | | | | | 9.90 | 9.03 | 0.31 | 3.1 − |
| → | | | | | | +0.92 | −0.8 | +2. |
| + 1 Cyc. | | | | | | 9.95 | 9.51 | 5.1 |
| | | | | | | +0.46 | −0.4 | +1. |
| + 1½ Cyc. | | | | | | 0.41 | 9.11 | 6.1 |
| | | | | | | −0.46 | +0.4 | −1. |
| + 1 Cyc. | | | | | | 9.95 | 9.51 | 5.1  1. |
| → | | | | | | | +0.92 | −0.8  +2. |
| + 1 Cyc. | | | | | | | 0.43 | 4.3  3. |

Fig. 41

INVENTOR
George C. Chase
BY
Stuart Wilde ATTORNEY

Patented Jan. 18, 1944

2,339,616

UNITED STATES PATENT OFFICE 2,339,616

CALCULATING MACHINE

George C. Chase, South Orange, N. J., assignor to Monroe Calculating Machine Company, Orange, N. J., a corporation of Delaware Application July 22, 1939, Serial No. 285,860

31 Claims. (Cl. 235—63)

The invention has relation to calculating machines, and more particularly to the provision of means for effecting division automatically.

According to a well known method of calculating machine operation (see United States Patent No. 1,011,617 issued to Christel Hamman on December 12, 1911) when repeated cycles of subtractive registering operations have reduced a dividend to a negative quantity, the register carriage is shifted and the divisor added until the registration becomes positive. This will correct the previous quotient figure registration (through the action of tens transfer means in the quotient register) and give a correct registration of the second quotient figure.

What may for convenience be referred to as a modification of this system (although probably antedating it) was proposed by Dr. Eduard Selling (see German Patent No. 39,634, issued July 1, 1887). According to this system registration is interrupted whenever the value of the active dividend (whether positive or algebraic) is brought to half or less than half the value of the divisor, whereupon the dividend and divisor are relatively shifted and additive calculation initiated if the sign of the new dividend is found to be minus (negative registration), or subtractive calculation if the sign is found to be plus (positive registration).

The calculating machines designed and used by Dr. Selling for operation according to this method relied upon the observation and control of the operator in securing the novel effects, and might equally well have been operated according to any other known system.

The Selling machines were provided with tens transfer mechanism of the "crawl" type in the dividend register. Having started a quotient figure registration in accordance with the sign of this register, the operator would continue an additive or subtractive registering operation until the dividend wheels located next to the left of, and opposite the extreme left hand divisor digit set in the keyboard, were brought substantially to a registration of zero. This condition might occur during any portion of a registering cycle, and the operator would thereupon continue to the end of the cycle or would reverse the actuation and return to the previous full cycle position, according to whether more or less than a half cycle of operation had been performed.

The preferred embodiment of the present invention provides means for automatically controlling a division operation in accordance with the Selling system, and includes the following features: the dividend register is provided with "crawl" tens transfer mechanism, the wheels being brought into aligned reading position whenever the machine comes to rest, in accordance with the disclosure of U. S. Patent No. 2,089,682, issued to George C. Chase on August 10, 1937. Movement of the highest order significant wheel approximately to zero registering position will be indicated by mechanism operating in a manner similar to that disclosed in U. S. Patent No. 2,106,273 issued to Howard M. Fleming on January 25, 1938. Movement of this signal mechanism during the first half of a registering cycle will operate mechanism adapted to reverse the differential actuators of the machine and stop them in the previous full cycle position; while occurrence of the signal during the last half of the cycle will operate mechanism serving to stop the machine at the end of the cycle. Means are provided for automatically shifting the carriage for the computation of the next quotient digit when the differential actuators are brought to rest. Operation of the controlling signal by the lower order numeral wheels is prevented by cut off mechanism related to the highest order divisor digit set in the keyboard, thus enabling provision to be made for shifting the carriage automatically to its proper starting position, and also for shifting continuously through intermediate 0 quotient registering positions. Novel means are provided for effecting a considerable part of the shifting of the register carriage during a registering operation, whereby under certain conditions the shifting of the carriage may be continuous throughout the entire calculation.

In each position of the register carriage in which calculation is to be made, the state of the register will control the sign of the new registration, so that when a negative value stands in the register addition will be effected and when a positive value stands in the register subtraction will be effected. Applicant is aware that in certain patents issued to Alexander Rechnitzer, and specifically in British Patent No. 156,715, and in machines which have been constructed in accordance with these patents, division mechanism is disclosed wherein division will be performed in the normal manner if the dividend is installed as a plus value and will perform additive division if the dividend is installed as a complement. However, the control of the sign of the registration in accordance with the state of the register is confined in these Rechnitzer disclosures to the initial operation of the machine, the operations in succeeding register positions being effected according to a fixed program.

The above outline of the machine has no essential relation to the novel features or results attained, many of such features and results being more intelligibly set forth in connection with the detailed descriptions.

The invention consists in the novel construction and combination of parts, as set forth in the appended claims.

In the accompanying drawings, illustrating the invention,

Fig. 2 is a fragmentary section, taken through the keyboard and registering mechanism of the machine, the parts being shown in normal position.

Fig. 3 is a detail perspective view of means for lowering and raising the cut off lever shaft.

Figs. 4, 5, 6 and 7 are detail elevations of the setting slides for a differential actuator unit.

Fig. 8 is a detail elevation, partly broken into section, of a differential actuator unit, the transverse dimensions being of a scale twice that of the longitudinal dimensions.

Fig. 9 is a left side elevation of the machine, partly broken away and having the left side casing plate removed, the parts being shown in normal position and certain parts being omitted.

Fig. 10 is a detail elevation of a shutter cam shown in Fig. 9, in position assumed during operation.

Fig. 11 is a left side elevation of the machine with parts broken away and having the left hand side casing plate removed, parts not shown in Fig. 9 being shown, in normal position.

Fig. 12 is a detail elevation of a link and associated parts, partly obscured in Fig. 11.

Fig. 13 is a detail left side elevation of parts related to the shutter cam.

Fig. 14 is a left side elevation of parts operating to initiate machine cycling.

Fig. 15 is a left side elevation of parts operating to interrupt machine cycling.

Fig. 16 is a left side elevation showing the parts controlling the return of the differential actuators from mid cycle to previous full cycle position.

Fig. 23 is an enlarged fragmentary section through the numeral wheel assembly.

Fig. 24 is a detail left side elevation showing a modified form of the means for interrupting machine cycling.

Fig. 25 is a detail right side elevation showing a modified form of the means for initiating machine cycling, the parts being shown in position as set during division operation and with the numeral wheel at 0.

Fig. 26 is a detail left side view showing parts cooperating with those of Fig. 25 and also showing means for correctly terminating the operation, whether the dividend is entered normally or complementally, these parts all being shown in their normal positions.

Figs. 27 to 40, inclusive, illustrate a modified form of the invention wherein the signal control operates through electric circuit means, Fig. 27 being a section taken through the mechanism indicating the sign of the numeral wheel registration, in normal disabled position and with the numeral wheel at 0.

Fig. 28 is a plan view of the same, with parts broken away.

Figure 29:
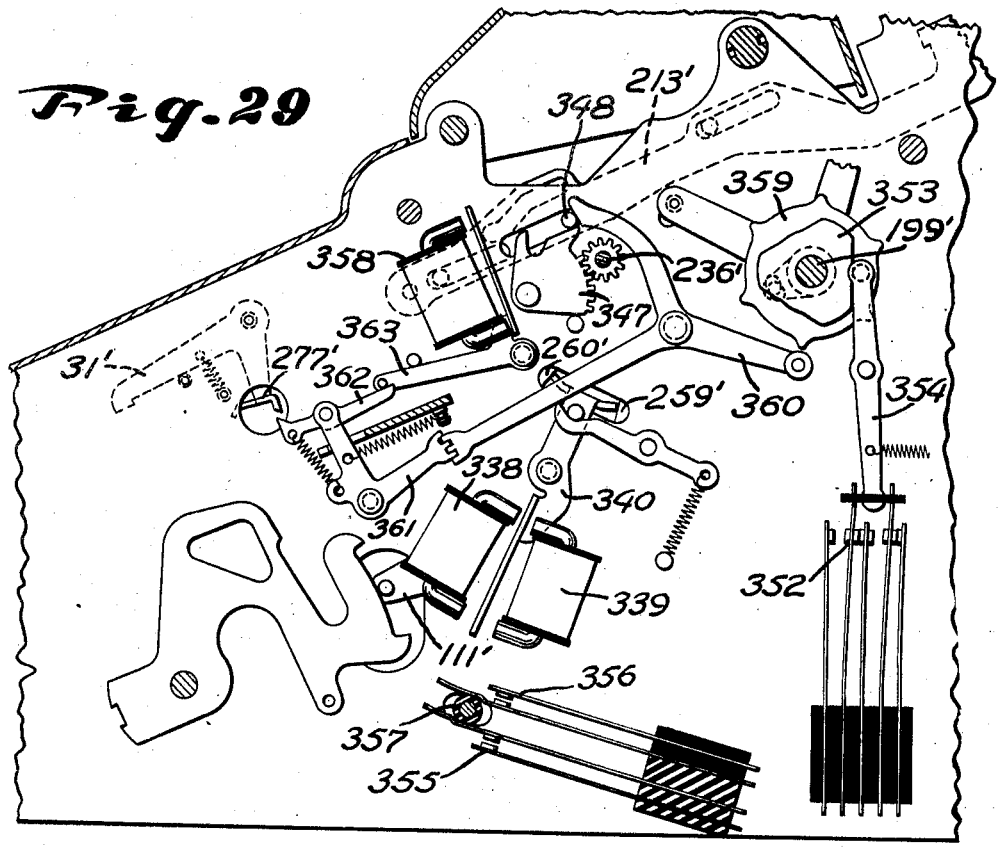

Fig. 29 is a right side elevation of the operation control means.

Figure 30:
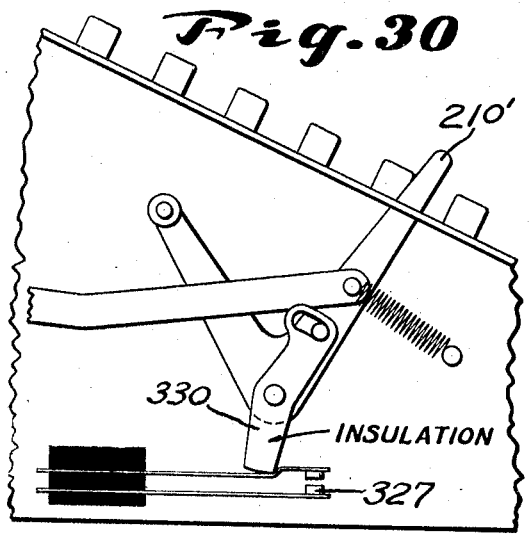

Fig. 30 is a left side elevation of the division lever and related switch.

Figure 31:
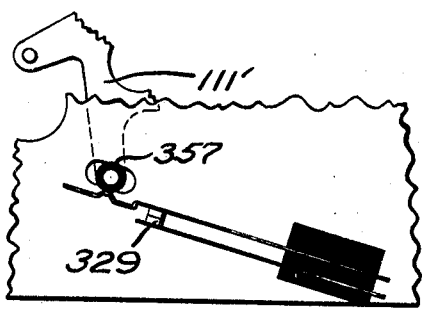

Fig. 31 is a detail elevation of a switch controlling the operation of the plus, minus solenoids.

Figure 32:
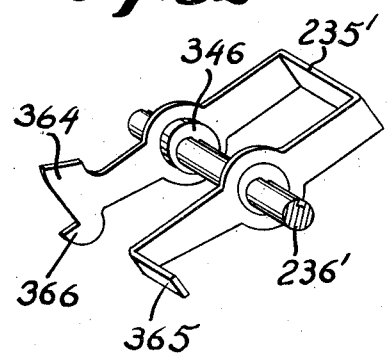

Fig. 32 is a detail perspective view of a hold-out lever.

Figure 33:
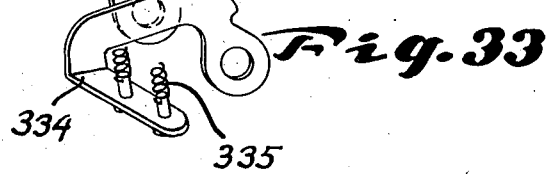

Fig. 33 is a similar view of one of the upper contact members.

Figure 34:
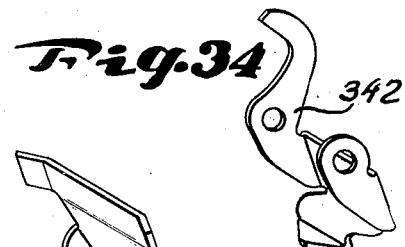

Fig. 34 is a similar view of a sensing lever.

Figure 35:
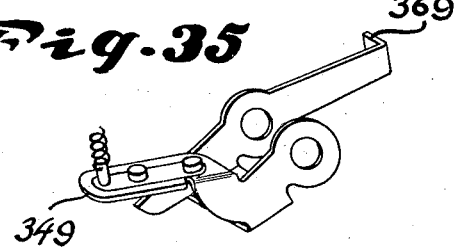

Fig. 35 is a similar view of one of the lower contact members of a related pair.

Figure 36:
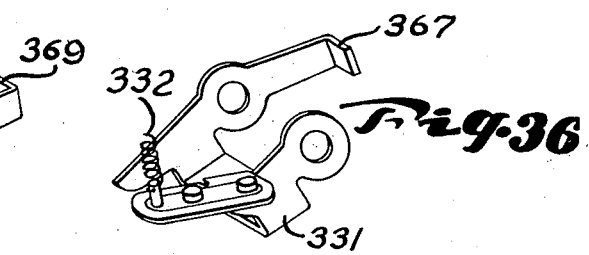

Fig. 36 is a similar view of the other lower contact member.

Figure 37:
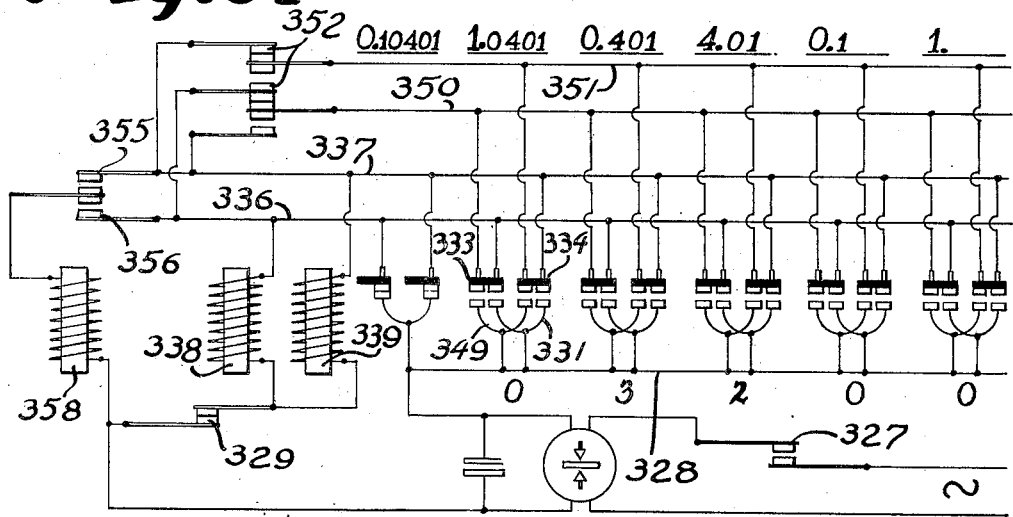

Fig. 37 is a wiring diagram, with parts in position as assumed with a divisor and dividend set in the machine preparatory to a division operation, with the division lever in its normal position.

Fig. 38 is a similar view, showing the changed position of certain of the electrical contacts the instant the division lever is set into active position, but before the differential actuating mechanism of the machine has been started.

Fig. 39 is a similar view, with parts in position taken after the completion of three and one-half cycles of operation.

Fig. 40 is a similar view, showing the position of the parts taken after three and one-half cycles of operation in calculating a different example.

Fig. 41 is a diagrammatic illustration of the successive numeral wheel readings and of the values successively added or subtracted in each numeral wheel during the course of a division calculation, as performed upon a machine corresponding to the first described or mechanical form of the invention.

*Installing and registering mechanism*

Figure 1:
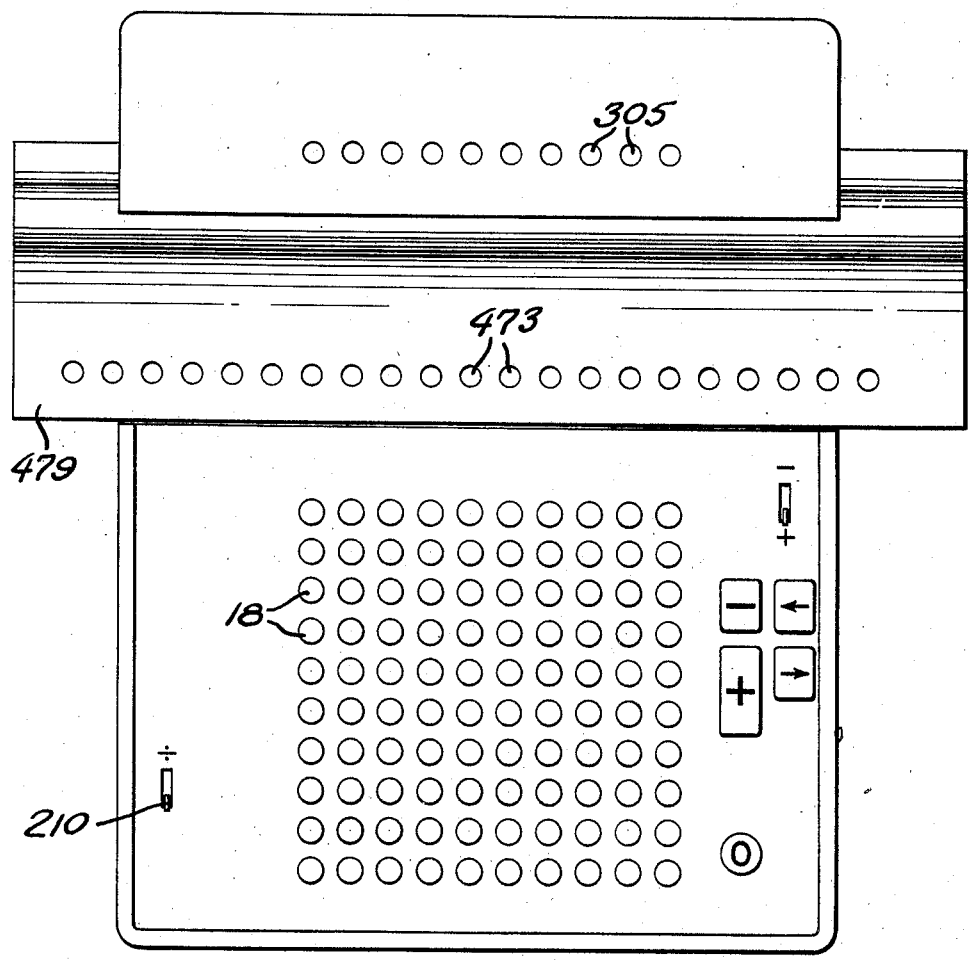
Fig. 1 is a plan view of a calculating machine, embodying the invention.

The dividend having been entered in the numeral wheels 473 (Fig. 1), in the usual way, the divisor will be set on the keys 18. These keys serve to set the selected value into the differential actuators of the machine in accordance with the semi-complemental method of digitation described in United States Patent 2,233,912 issued March 4, 1941, on a co-pending application of George C. Chase, filed November 24, 1937. That is to say, the digits 1 to 4 are registered normally, while the digits 5 to 9 are registered as +10, −5, etc. in addition, or as −10, +5, etc. in subtraction.

The keys 18 serve to position slides 46, 48, 50 and 52 (Figs. 2 and 4–7), these slides being adapted to swing trains of pendant gears 197, 203 and 204 (Fig. 8) into contact with one or the other of two oppositely driven gears 198, 199 (Fig. 2), the pendent trains being in constant mesh with the input legs of a differential gearing 200 (Fig. 8). With reference to additive calculations slide 46 will serve to set the pendant train 197 to register −1 during each cycle of operation; slide 52 will act to set the pendant train 197 in the next higher order to register +1, thereby effecting an entry that is +10 with respect to the order in which the key was depressed; slide 48 will act to set pendant train 203 to register +4 or −4, selectively, and slide 50 will act to set pendant train 204 to register +2 or −2, selectively. These slides are set singly or in combination by a key 18, the part digits represented by the slides being combined in the differential gearing so that the output gear 201 of each differential actuator will register the sum or the difference thereof.

Slides 46 and 52 are provided with rack portions, connected for differential setting effect by pinions on the arms supporting the related pendent trains. Therefore, considering these slides for the moment as racks, the rack 52 associated with the pendent train 197 of the lowest order must be permanently fixed since there are no keys 18 of lower order to control it. Also the rack 52 related to the highest order of keys 18 must be provided with a cooperating pendent train 197 and gears 200 and 201 in the next higher order, in which the internal gear which meshes with pinion 200 must be permanently fixed. A fixed rack 46 should also be provided in that higher order.

Each output gear 201 normally stands in mesh with a wide faced gear 480, located in the numeral wheel carriage 479 and having driving connection with the numeral wheels 473 through gears 482, mounted for oscillatory movement about shaft 481. The arms 483 supporting these gears 482 are positioned by snail cams, fast upon the next adjacent lower order numeral wheels, the position of any given arm 483 upon its cam serving to displace gear 482 about shaft 481 to counteract the fractional positioning of the numeral wheel by the "crawl" tens transfer mechanisms. Upon operation of the machine a bail 489 having link connection with a bail 53 (Fig. 2), hereinafter described, serves to lift all of the arms 483 free of the snail cams and, by holding the gears 482 in aligned position across the machine, allows the numeral wheels to register according to the "crawl" tens transfer method.

The tens transfer and aligner mechanism is described in U. S. Patent No. 2,089,682, hereinbefore referred to.

No means are shown in the drawings for holding the dividend wheels which are beyond the base of the machine and consequently freed from the selector output gears, since suitable means are well known in the art. For example, the spring impelled detents and the releasing track shown in U. S. Patent No. 2,150,578, issued to George C. Chase on March 14, 1939, may be used for this purpose, these detents being adapted to engage the freed elongated pinions 480.

Upon starting the machine drive, the register is set for "crawl" tens transfer operation and the pendent trains of the differential actuator are locked in set position as follows:

A cam disk 76 (Fig. 10) is fast upon cyclically driven shaft 72, and is provided with a notch normally seating a roller of spring follower lever 80, which has operating connection with rock shaft 81. Also fast on shaft 81 is a bail 53 (Fig. 2), normally located beneath the locking fingers 54 formed on the free ends of the pendent gear supporting arms. Bail 53 is connected with a pair of lifting fingers pivotally mounted upon actuator shaft 45 and underlying bail 489. Upon rotation of shaft 72, lever 80 will be lifted out of the cam notch in plate 76, rocking shaft 81 and thereby lifting bail 53 into engagement with the locking fingers 54 and lifting bail 489 to raise the arms 483 into crawl transfer position.

In order to hold the above-named parts in set position during a registering operation of several cycles, a cam disk 75 or shutter cam (Fig. 10) is loosely mounted upon shaft 72 and has pin and slot connection 77 with disk 76; normally a cam notch of disk 75 lies in alignment with the cam notch of disk 76, but upon movement of the machine from full cycle position, disk 75 will lag until picked up by the pin and slot connection so that the roller of lever 80 will be prevented from falling into either of the cam notches so long as the parts continue in rotation in the original direction. As set forth in the before mentioned Patent No. 2,233,912, actuator movement is arrested by stopping the forward movement of the actuators beyond full cycle position, and by returning them idly to normal. During this return movement, disk 75 will remain stationary, with its cam notch in alignment with the roller of lever 80, while disk 76 will be returned to the position in which the two cam notches will register. In operations other than division, the before described parts will therefore be allowed to return to normal position whenever the actuators are brought to rest.

*Division lever*

Lever 210 (Figs. 1 and 11) is pivoted on the left hand frame plate of the machine, and is designed to be moved rearwardly by the operator to set the different mechanisms in dividing position and to start an automatic division operation. Link 211 and lever 212 (Fig. 12) connect the division lever with the division slide 213, slideably supported from the frame plate by pin and slot connection.

Movement of division slide 213 by the division lever will operate to prevent the return of the numeral wheels to aligned position and to prevent the unlocking of the pendent gear trains when the actuators are brought to rest for the purpose of shifting the register carriage during a division computation. For this purpose, lever 80 controls shaft 81 through an arm 214, fast on said shaft and having a lug overlying a rearward extension of lever 80. A spring impelled latch 215 (Fig. 13), pivotally mounted on the frame plate, is adapted to engage under the lug of arm 214, being normally held from such engagement by a pin 216, fixed in the division slide. When the division slide moves forwardly, under the rearward impulse of division lever 210, pin 216 will allow latch 215 to move against the lug of arm 214, and to latch said arm in raised position as soon as the roller of lever 80 has moved out of the notch of disk 76.

Other functions of the division slide 213 will be taken up in connection with the description of the mechanism involved.

*Control by the dividend register*

Figure 17:
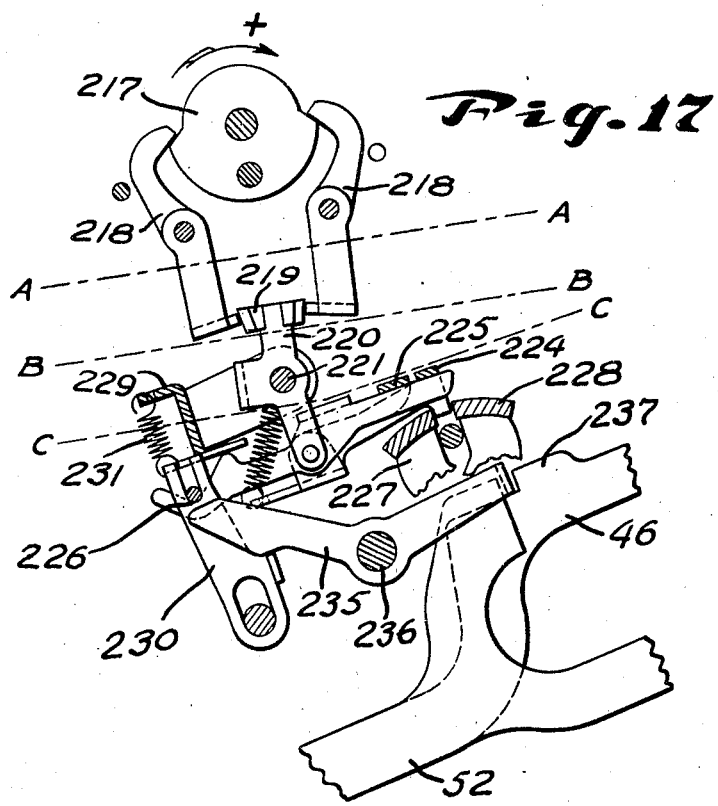
Fig. 17 is a section taken through the mechanism indicating the sign of the numeral wheel registration, in position as set during division operation and with the numeral wheel at 0.
Figure 20:
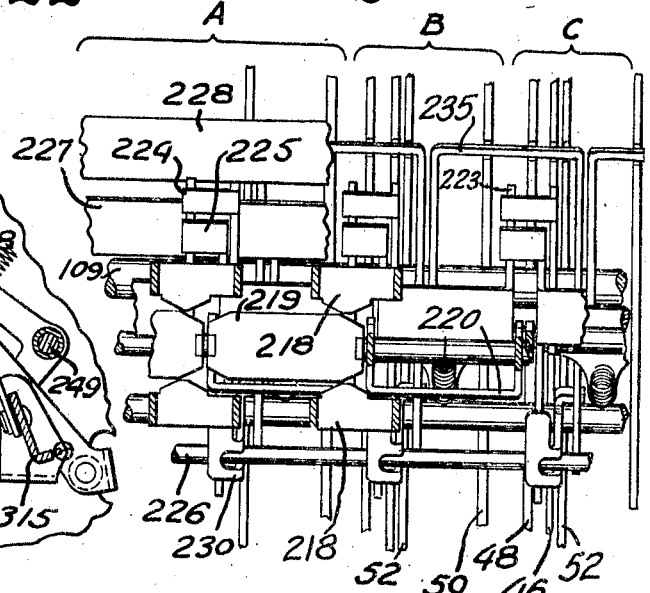
Fig. 20 is a horizontal section, taken on line a—a, Fig. 17, with parts broken away and showing mechanism appearing at lines b—b, and c—c, Fig. 17.

Attached to each numeral wheel of the dividend register is a cam 217 which will stand in the position shown in Fig. 17 when the related numeral wheel stands at zero registering position. A pair of sensing levers 218, 218 is associated with each cam 217, being mounted on shafts fixed in the register carriage. Each lever 218 is provided at its lower end with a transversely disposed cam portion (Figs. 17 and 20) which, as the carriage shifts, will slide along a series of beveled shoes 219, fixed in the upper ends of a series of rockers 220. The rockers 220 are mounted on a shaft 221, fixed in the base of the machine, a rocker 220 being related to each order of differential actuating mechanism. An additional rocker 220 located at the extreme left of the series provides a division control from a numeral wheel two places beyond the left hand key bank, this being necessary in some calculations involving a divisor in which a value of 5 to 9 is set in this left hand key bank. The sensing levers 218 and shoes 219 are so designed that a pair of said levers will position the rocker 220 located therebetween in accordance with the position or the movement of the numeral wheel while the carriage is making its first three-fourths of a step of movement toward the left, during which time the machine may be cycling, and so that the sensing lever will move out of contact with one shoe and into contact with the shoe of next higher order during the last quarter of a step of carriage movement. The beveled ends of the shoes 219 provide for the proper adjustment of the newly engaged rockers as the carriage is shifting.

Figure 19:
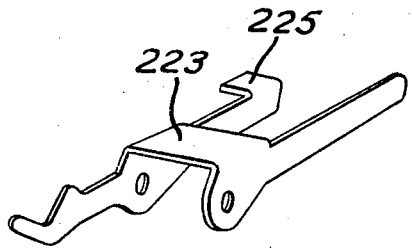
Fig. 19 is a similar view of a hold out lever.
Figure 18:
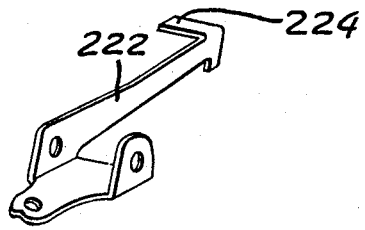
Fig. 18 is a detail perspective view of a catch pawl.

Pivotally mounted on the lower end of each rocker 220 is a spring impelled catch pawl 222 (Fig. 18) having an angularly disposed toothed end, and a concentrically pivoted hold out lever 223 (Fig. 19), one end of which extends under a lug 224 of the catch pawl of next lower order and the other end being formed with a V notch to provide opposed camming surfaces. Thus a catch pawl in one order and the hold out lever of the next higher order comprise an operatively related pair and no hold out lever is needed in the lowest order of the machine.

Each hold out lever is also provided with a lug 225, overlying the hold out lever of next higher order. The opposed walls of the V notches of the hold out levers 223 engage a fixed rod 226, and serve as cams for imparting pivotal movement to the levers upon movement of rockers 220. Thus movement of a higher order numeral wheel from 0 registering position will, through rocker 220, move the related catch pawl about 3/32 of an inch from its centralized position, and will at the same time lift the rearward end of the related hold out lever, thereby lifting out of active position any of the catch pawls of lower order which have not previously been lifted and providing that the controlling signal can come only from the highest order numeral wheel which is sufficiently displaced from its zero position to be capable of giving a signal.

The toothed ends of the catch pawls are adapted to enter the space between the two pivoted control bars 227 and 228, one or the other of these bars being displaced from normal position by the catch pawl related to the highest order numeral wheel displaced substantially from zero registering position.

Certain operations of the machine are controlled by the movement of bars 227 and 228, the movement of a given bar transmitting a signal indicating the condition or a change of condition in the register.

The hereinbefore mentioned Patent No. 2,106,273 shows how the condition of a register equipped with crawl tens transfer mechanism may be determined through the operation of cams functioning similarly to the present cam 217. This cam 217 has high and low portions acting upon the sensing levers to hold the bar 227 or the bar 228 in displaced position as the related numeral wheel registers from ½ to 4½ or from 5½ to 9½, respectively. Registrations of 0 and 5 will locate the sensing levers in an intermediate position, wherein no signal is transmitted. Displacement of the sensing levers by contact or movement along the slope of cam 217, at either side of 0 registering position will signal a change of sign in the register, as follows: If the highest order active numeral wheel is moved subtractively from zero during the registration cam 217 will move the sensing levers 218 in a clockwise direction, indicating that the registration is negative. If the subtractive movement is continued the tens transfer mechanism will move the next higher numeral wheel appreciably from zero, bringing the tooth of the catch pawl 222 related to that higher order numeral wheel against the bar 228 and lifting the lower order catch pawl out of active position. This action occurs before the original significant wheel rotates far enough in a subtractive direction to relinquish its control of an overdraft signal which occurs approximately at a registration of 5.25. Said higher wheel will thus insure the transmission of an overdraft signal, even though the original significant wheel has passed below 5 and into the range where it would give a plus signal if it were in control. Similarly, additive registration on the highest order active numeral wheel will move the sensing levers 218 in a counterclockwise direction, to indicate that the registration is positive, and continued additive movement of the wheel will shift the normal registration signal to the next higher wheel, through the tens transfer mechanism, before the high portion of the first named cam will cease to control. It will be obvious that a signal from a wheel standing at 5 will never be necessary, since a wheel standing at 5 will have shifted the control to the next higher wheel.

Obviously, the precise point upon the slope of cam 217 at which a signal indicating a change of sign will become effective to control the operation of the machine will depend upon accuracy of adjustment of the parts, lost motion, etc. According to the present disclosure, the plus range may be considered to extend from a registration of approximately .25 to approximately 4.75, which is somewhat more than the theoretical minimum required by cams which are ineffective to signal between 4.75 and 5.25. If the lowest of two adjacent wheels does not relinquish control until it moves additively through 4.75 the higher wheel is not required to take over the control until it moves through 4.75, but in practice, there must be an overlapping of these controls whereby the higher wheel becomes effective before it has moved one tenth as far from zero as the lower wheel has moved when it relinquishes the control. This overlapping of the control is necessary, not only in order to insure that one or the other of the feelers may be in position to give the correct signal, but also to insure that a catch pawl may not be withdrawn from between the control bars before a higher order pawl is located in signalling position.

From the above it will be seen that the highest order wheel displaced substantially from zero registering position will indicate the state of the registration, and that if the registraiton is positive catch pawl 222 will move bar 227 out of its normal position, while a negative registration on the wheels will result in movement of bar 228 out of its normal position, all of the catch pawls to the left of the significant wheel lying in normal position, between the bars, and all of the catch pawls to the right of the significant wheel being held out of contact with the bars 227, 228 by the hold out levers.

Of course, during the overlapping of the controls noted above, either of two adjacent wheels may be regarded as the significant wheel, the catch pawls 222 related to each of these wheels simultaneously holding the bar 227 or 228 in signalling position.

Means are provided to lift all of the catch pawls away from the control bars except when the divide key is set to operative position, this means comprising a universal bar 229 which overlies a series of vertically guided slides 230, one slide being provided for each hold out lever. The upper ends of the slides 230 are provided with lugs overlying the forward arms of the hold out levers, so that depression of the universal bar will disable all of the catch pawls 222. Springs 231 hold the slides 230 against the universal bar 229. An additional hold out lever 225 should be provided at the left of the highest order catch pawl 222, or equivalent means employed to lift this catch pawl upon operation of bail 229. The additional hold out lever, if used, may be mounted as in the other orders or in any other suitable manner. Universal bar 229 is lifted during the first half of the setting movement of the division lever by means of a rock shaft 232 (Fig. 2) having arms 233 engaging the universal bar and an arm 234 (Fig. 11) provided with a pin engaging a cam slot of the division slide 213.

In order to prevent the building up of spring tension from the lower order signaling devices, tending to load up the higher order numeral wheels, and further in order to provide a convenient means for shifting the register carriage idly through positions having a quotient value of naught, a cut off means has been provided which will prevent the operation of a signal from a numeral wheel located to the right of the highest order in which a digital value registration is to be made.

For this purpose cut off levers 235 are mounted on a shaft 236 and are provided with forward arms engaging lugs of the slides 230, and rearward arms each having a lug or bail portion adapted to engage shoulders 237 (Figs. 4 to 7 and 17) of the setting slides 46, 48, 50 and 52 related to a single order of differential actuator gearing (as shown in Figs. 8 and 17), when any of said slides are set to active position. Shaft 236 is mounted upon pivot arms 238 (Fig. 3) and normally lies in the raised position shown in Fig. 2, being moved to the position illustrated in Fig. 17, during the last half of the movement of the division lever to operative position, by means of a pin 239 fixed in one of the arms 238 and engaging a cam slot of the division slide 213. Pinions are mounted on the ends of shaft 236 and engage fixed racks 240 for the purpose of keeping the movement parallel. Upon setting the division lever, the cut off levers 235 are thus moved downward, and any such levers which are brought into engagement with the shoulder 237 of a set value entering slide will be rocked counter-clockwise, thereby depressing the related slide 230 and hold out lever 223. By this means all of the catch pawls 222 lying to the right of the highest order divisor digit, or to the right of a column on the left thereof wherein a shortcut tens slide 52 is set, will be lifted away from the bars 227 and 228.

In order that the tooth of the catch pawl 222 related to the significant dividend wheel may drop between the control bars 227 and 228 when the universal bar 229 is raised, it is necessary to displace or open the control bars when the division lever is set to operative position, whereafter the bars must be immediately released, so that the bar which is not held open may resume its normal position before a machine cycling operation is initiated. The bars are opened during the first half of the division lever setting and released during the last half thereof, by means of a pawl 241 (Fig. 11), mounted on division slide 213 so as to engage a lug 242 (Figs. 11 and 15), formed on one arm of bell crank lever 243. Movement of the division slide will rock the bell crank lever clockwise, thereby (through lugs 244 and 245 of the bars 228 and 227 respectively, engaged by bell lever 243) rocking the bars to open position. At mid stroke of the division slide 213, a cam shoulder of pawl 241 will engage a fixed pin 246, and the pawl will be lifted out of engagement with lug 242 and the bars 227 and 228 released.

*Starting of the operation*

Figure 22:
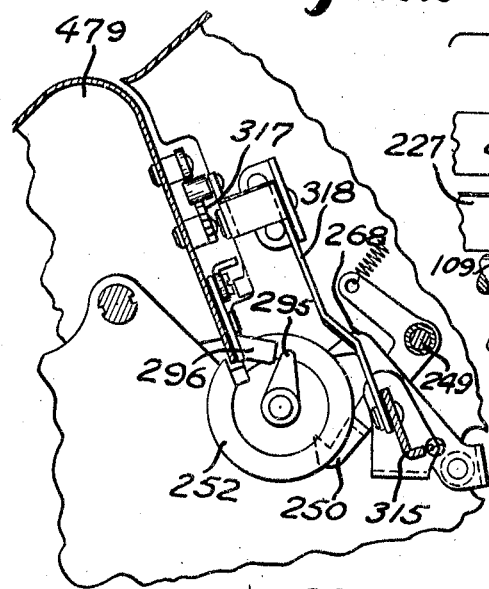
Fig. 22 is a section taken on line 22—22 of Fig. 21.

The machine is put into operation by starting the shifting of the carriage toward the left. Near the end of the setting stroke of the division lever a pin 247 (Fig. 11) fixed in the division slide 213 rocks a bell crank lever 248, loosely pivoted upon shaft 249. The carriage left shift clutch detent 250 (Figs. 21 and 22) is provided with a lug 251 extending through the left frame plate of the machine and underlying bell crank lever 248, so that upon operation of lever 248 the detent is lifted and the clutch started. The clutch is of conventional design and forms no part of the present invention. Fast to the clutch is a shifting worm 252, which operates in a notched plate 253 of the carriage in known manner. In extreme left shifted position, worm 252 will lie within a wide notch or gap 254 of plate 253, so that the worm may rotate idly with the carriage in this position.

The electric motor with which the shifting and other clutches are in driving connection may be constantly running, or alternatively, a switch may be interposed in the motor circuit and operated in known manner from division lever 210.

Since machine cycling and carriage shifting may run concurrently, the starting of the left shift clutch immediately initiates machine cycling (assuming the carriage to be in correct starting position) according to the sign of the dividend. That is to say, if the dividend is plus (positive) the machine is started in minus cycling, while if the dividend is minus (negative) the machine cycles in the plus direction.

To accomplish this a cam 255 (Fig. 14) is secured to the left shift clutch, being shown in position taken with the clutch in normal position of rest. Bell crank lever 256 is provided with a roller riding cam 255, and to the opposite end of said lever are pivoted rams 257 and 258, these rams being provided with pawls 259 and 260, adapted to engage lugs 261 and 262 located at opposite sides of the pivot 263 of a reversing clutch lever 111. Clutch lever 111 is substantially the same as that illustrated in U. S. Patent No. 1,566,650, issued to George C. Chase on December 22, 1925, the differential gearing transmission engaged by said clutch lever being fully described in that patent. Arm 113 of clutch lever 111 is adapted to engage one leg of the differential, to effect subtractive rotation of the actuators, while opposite displacement of the clutch lever 111 will bring arm 114 into engagement with another leg of the differential to effect additive movement.

As seen in Fig. 15 the control bars 227 and 228 are provided with depending arms having lugs 264 and 265 respectively, these lugs engaging the upper ends of pawls 259 and 260. Spring 266 normally holds said pawls in ineffective position, in which they will not contact with the lugs 261 and 262 upon operation of the rams 257, 258. When bar 227 stands in displaced position, however, lug 264 will be moved toward the left as seen in Fig. 14, moving the lower end of pawl 259 toward the right, bringing the pawl above lug 261. Now, upon movement of the driven member of the carriage shift clutch, cam 255 will operate the rams (against the tension of spring 267) and reverse clutch lever 111 will be rocked counter-clockwise as seen in Fig. 14, starting a subtractive operation. Similarly, bar 228 being in displaced position pawl 260 will lie over lug 262 when the ram is operated and the reversing clutch lever 111 will be thrown into adding position.

If the division key is operated with the carriage too far toward the right, that is to say if the dividend wheels lying to the left of the orders which are cut off stand substantially at naught, both control bars, 227, 228 will be in normal position and neither of the ram pawls 259, 260 will engage the lugs of clutch lever 111 until the carriage has shifted sufficiently toward the left to bring the dividend setting into controlling position.

*Shift and cycle interruption*

The machine may run perhaps three cycles while the carriage shifts three-fourths of a step toward its next position, but registration must not occur during the final quarter step of the shift, which brings the numeral wheels into different driven relation to the differential actuators. Therefore, in registering a quotient digit of 4, 5 or 6 the shifting of the carriage must be interrupted at three-fourths shifted position until the registration is completed. Registration of the other quotient digits, requiring no more than three cycles of operation, will not necessitate interruption of the shift, so that such values may be registered during a continuous movement of the carriage through an appropriate number of registering positions.

Interruption of carriage shifting is provided for by a three-fourths shift detent 268 (Figs. 13, 21 and 22) which acts on the carriage left shift clutch, during division operations, in place of the detent 250, the latter detent having been lifted as previously stated under the heading "Starting of the operation," and held out of action by the division slide 213. An arm 269 is fast to detent 268 and is normally engaged by the pin 247 on division slide 213, to hold said detent away from the carriage shift clutch. Movement of the division lever to active position will move pin 247 away from arm 269, making it possible for the detent to move into operative position, under the influence of spring 270. Detent 268, however, is further held in disengaged position by means of a link 271 connecting arm 269 with the lever 80, previously described as controlling the locking of the pendent actuator trains, etc., this link having pin and slot connection with arm 269. During the cycling of the machine the roller of arm 80 will ride cam disks 75, 76, and link 271 will be pulled to the right as seen in Fig. 13, allowing detent 268 to drop into position to disengage the left shift clutch in its three-fourths shifted position. Upon completion of a quotient digit registration, however, the roller of lever 80 will fall into the notches of the disks, and detent 268 will be lifted free of the clutch, so that the carriage shift will be started or will not be interrupted, as the case may be.

Machine cycling must be interrupted whenever the dividend value changes its sign. As shown in the form of the invention now being described, the change of sign is signalled when the controlling dividend wheel moves subtractively below or additively above 0.

The means for bringing the differential actuators to rest in full cycle position are shown in Fig. 9, and correspond to the disclosure of the hereinbefore mentioned Patent No. 1,566,650. In accordance with this disclosure, a trigger 31, normally holds a pawl 25 out of the path of movement of a shouldered rock lever 22, connected by link 21 and crank arm 20 with the cyclically driven shaft 72, the latter having gearing connection with the reversely driven gears 198, 199 (Fig. 2) and being driven through the main clutch, under the control of reversing clutch lever 111.

Pawl 25 is mounted on stop arm 24, and upon being released by trigger 31 will be spring urged into the path of movement of the shoulder of rock lever 22, effecting a coupling of lever 22 and arm 24, so that the latter is driven forwardly as the parts move through full cycle position. During this movement a rearward extension 144 of arm 24 is raised, bringing a centralizing cam portion thereof into contact with a pin on clutch lever 111, to move the clutch lever to neutral position. The actuators being unclutched will be returned to full cycle position by arm 24, under the influence of a spring 28, during which return movement a lug of pawl 25 will contact with the end of trigger 31 and the pawl will be lifted out of engagement with the lug of rock lever 22.

In division operations trigger 31 is tripped by the action of cycle interruption rams 272 and 273 (Fig. 15), which are pivotally mounted on the plus and minus control bars 228 and 227 respectively. Rams 272 and 273 are held upwardly under spring tension against a guide pin 274 fixed in a lever 275 (Fig. 11). When the division lever 210 lies in normal position, a pin 276 in lever 212 rests against a shoulder of lever 275 and holds pin 274 in lowered position, holding the rams 272, 273 below a lug 277 formed on trigger 31. Movement of the division lever to operative position will move pin 276 from the shoulder of lever 275, the latter now being controlled by the click pawl 115 of the clutch lever 111, a lug formed on the lever being held by the ram springs against the lower edge of the pawl. It will be noted that the middle notch of this click pawl is shallower than the two notches which maintain the clutch lever in its active positions, the shallower notch serving to hold lever 275 in its lowered position, while the deeper notches will allow the lever to rise under the influence of the ram springs, to bring the free ends of the rams opposite lug 277.

This construction provides that whenever the control bars are opened with the clutch lever at neutral position, the interruption rams will move idly beneath lug 277. As a dividend wheel standing in the plus or minus range shifts into controlling position one of the rams will remain under the lug 277, but the other will be retracted, so that when cycling starts it will move upwardly opposite said lug. Upon a change of sign in the dividend wheels the last named ram will be moved forwardly, tripping trigger 31 and bringing the actuators to rest. As the clutch yoke is centralized during this operation, the guide pin 274 will be lowered, freeing the trigger from the ram.

The signal which interrupts machine cycling also shifts the position of the ram pawls 259, 260, previously described and illustrated in Fig. 14. As the control bars shift their positions upon a change of the dividend sign, the lugs 264 and 265 will shift their positions so that the ram pawl which initiated the current cycling operation will be allowed to move out of active position while the other ram pawl should be moved into active position. However, at this time, the lug 261 or 262 of the clutch lever will momentarily obstruct the last named pawl, the ram moving outwardly and spring 266 being tensioned. Upon the termination of cycling, the clutch lever III is centralized, moving the obstructing lug below the ram pawl and allowing the pawl to snap into position above the lug.

At this time, the three-fourths shift detent 268 is released as previously described, and the carriage shift is completed into the next quotient digit computing zone.

Mid-cycle reversal

It may occur that the significant dividend wheel will change its sign during the first half of a plus or minus cycle of operation. In that event the direction of rotation of the differential actuators is to be reversed as the parts come to mid cycle position, and driven reversely to the previous full cycle position, where they will remain at rest until the carriage completes its last quarter step of shifting movement, into the next computing zone.

For this purpose a second rock lever 278 is provided (Fig. 9) similar to the rock lever 22, but so connected through link 279 and crank arm 280 to a cyclically driven shaft 281 that it will be driven in the opposite direction to the lever 22. Preferably the cranks 20 and 280 are driven from the shaft 325 through a train of elliptic gears 39, 40, 73, so designed that the rock levers 22 and 278 are moved at maximum speed through the position in which they may be engaged by pawl 25, so that immediately after the passage of the actuators through full cycle or half cycle position, the rock lever will move under pawl 25, and no action of the stopping arm 24 will occur until the completion of the next half cycle of operation. Lever 278 cooperates with pawl 25, as previously described in connection with the signed to occur only during division operations, lever 22, but since a mid-cycle reversal is designed to occur only during division operations, the contacting shoulder of lever 278 is formed in a pawl 282, pivoted on said lever and normally spring held out of position of engagement with pawl 25. Setting of division lever 210 to operative position will bring a roller 283 thereof (Fig. 11) into contact with an arcuate extension of pawl 282, thereby holding said pawl in active position during the oscillation of lever 278.

The shoulder of pawl 282 will pass to a position in rear of the contacting portion of pawl 25 whenever the machine passes through mid-cycle position, so that if pawl 25 is tripped during the first half of the cycle, arm 24 will be coupled to rock lever 278, the clutch lever III brought to neutral position and rotation of the differential actuators will be checked.

Upon the return of the actuators from the overrun movement beyond half cycle, the clutch lever III must be reengaged oppositely to return the actuators to normal position. This may be accomplished by applying the automatic reversing mechanism of U. S. Patent No. 1,888,161 to the clutch yoke III and the link 279 (Fig. 9) of the mid-cycle interrupting mechanism, or by means of a spring impelled lever 284 (Figs. 11 and 16) fulcrumed on the left side frame, and provided with a roller which rides the cam 285, secured upon shaft 281. This lever is normally held by an escapement device comprising the latch 209 and the lever 287. The forward end of lever 287 is spring held against the pivot stud of pawl 25.

Each operation of the stopping arm 24 operates the escapement device, but the cam 285 prevents the lever 284 from acting except at mid-cycle position. The forward movement of arm 24 upon mid-cycle interruption drops the lever 284 slightly as the restraint is shifted from latch 209 to the shorter arm of lever 287, while the return movement frees the lever 284 to function as it drops against the cam 285 under the influence of spring 286, the yieldable latch 209 being unable to relatch the slightly lowered forward end of lever 284. A link 288 connects the lever 284 with the rams 257, 258 through a pin and slot connection, so that upon operation of the lever the ram pawls will be driven to reengage the clutch yoke III. This reengagement will be of reversed sign, since the dividend register has reversed its sign.

Since this reversal of sign occurred during the first half of the cycle of operation, another signal of change of sign should be given during the return of the parts to full cycle position, but since this signal might be given too near the normal position to be relied upon, other means are provided to insure arrest of the actuators at normal. This consists of an auxiliary ram 289, pivotally mounted on lever 284 and spring held against guide pin 290, fixed in the left side frame plate. The end of this ram normally lies beyond the forward extension of lug 277 of trigger 31. When the roller of lever 284 drops to the low point of cam 285 a shoulder of ram 289 will be moved free of pin 290, so that the ram will rise to a position in rear of lug 277. In the movement of the parts back to full cycle position, cam 285 will move lever 284 and ram 289, the latter contacting lug 277 and thereby lifting trigger 31 to effect a stopping and the latch 209 will relock the lever 284.

It may be noted that during this mid cycle reversal, the notched cam disks 75, 76 will be momentarily positioned to align the notches, but since this action occurs with the parts rotated 180° from the position shown in Fig. 9, the roller of lever 80 will not be allowed to drop.

The use of two rock levers, as above described, provides for a minimum amount of cycling of the machine in division operations, but the purpose of the invention in effecting shortcutting would also be served if the actuators were always permitted to pass through full cycle position without interruption, and always returned from mid-cycle to full cycle position if a signal for the termination of a quotient digit registration has occurred, either during the last half of the preceding cycle, or during the first half of the current cycle. The omission of the arrangement for stopping the actuators at full cycle position results in somewhat more movement of the actuating mechanism when the signal is given in the last half of the preceding cycle, but the effect is the same insofar as the computation is concerned.

This result may be attained by any device which will bring the actuators to rest at the end of that cycle of division registration in which the algebraically diminishing value in the dividend register becomes substantially equal to half or less than half the value of the divisor expressed in similar algebraic terms. In effect this provides a mechanism whereby control is exercised by comparison of the values of the two factors.

In essence, this invention comprises an arrangement which utilizes the algebraically diminishing dividend registration to give a controlling signal in timed relation with the full cycle of the differential actuators in which the dividend wheels will register the lowest algebraic value, and the provision of devices responding to said signal to bring the actuators to rest at that full cycle position. By such an arrangement the remainder which is left in the dividend register at the conclusion of the computation of each quotient digit will have a minimum algebraic value, that is, it will be approximately equal to or less than half the algebraic value of the divisor, with the result that the next quotient digit may be computed with the minimum number of cycles which this system of short-cutting provides.

Continuation of the operation

The shifting of the carriage upon release of the three-quarter shift detent 268 involves the moving of certain of the numeral wheel gear trains in the carriage out of mesh with the differential actuator output gears in one order and into mesh with the output gears of the next higher order. The gears 480, which are elongated as shown in Fig. 23, may be provided with teeth beveled at their ends, to facilitate the meshing. Each gear 480 is made somewhat wider than ¾ of a decade space, in order that digital values may be transmitted from the output gears 201 to the numeral wheels 473 while the carriage in which the numeral wheels are mounted is being shifted three-quarters of a step.

During the remaining quarter step of the carriage shifting movement, it is desirable to open and again release the control bars 227, 228 in order to make certain that the tooth of the active catch pawl 222 stands between the control bars at the beginning of the next registering action.

Means for effecting this are shown in Fig. 15. It will be recalled that upon setting the division lever to operative position these control bars are opened by means of the bell crank lever 243. This lever is provided with a roller adapted to ride a cam 291, fast with the carriage left shift clutch, which is adapted to lift the roller during the first half of the last quarter step of carriage shift movement, opening the control bars, and to permit the roller to return and the bars to close during the last half of said movement.

As previously stated, the left shift clutch never stops in its normal position during a division calculation, but its passage through normal position marks the beginning of the computation in the next lower order. Each time this occurs, the cam 255 operates the rams 257, 258, to resume machine cycling according to the sign of the controlling dividend wheel. If that wheel stands at naught, cycling will not start and the carriage will continue to shift.

Calculation of the last quotient digit

Since the mechanism hereinbefore described gives a registration in each shifted position of the carriage in which the final quotient digit is so closely approximated as to leave a remainder having a positive or an algebraic value of approximately half or less than half the value of the divisor, it will be obvious that a computation of this character in the last place will give a quotient more nearly approximating the true quotient value than would be the case if the calculation were terminated invariably with a positive remainder in the dividend register. That is to say, a quotient having a true value in the last digit place of $7\frac{8}{10}$ would be more nearly approximated by a digit registration of 8 than by a registration of 7. The mechanism is therefore capable of rounding off the final quotient digit, to enhance the accuracy of the registration if the remainder is to be ignored.

Since in this last place the carriage 479 is incapable of shifting further in response to operation of the left shift worm, the termination of an idle shifting movement in this position will bring the entire machine to rest, and it will only be necessary to return the parts to normal position in order to terminate the division operation.

If the operator desires to register the exact remainder, and if the machine finally comes to rest with a negative registration in the dividend wheels, it will only be necessary to operate the known addition key or plus bar in order to effect the usual single corrective cycle of operation, which will give the desired registration of the remainder. It may be desired, however, to register the exact remainder automatically, for which purpose the control mechanism now to be described may be built into the machine. (If this is not desired, much of the control mechanism hereinafter described may be omitted.)

After the carriage has come into its extreme left hand shifted position, the initial operations are effected as previously described, except that the carriage does not shift, the shifting worm rotating idly in the gap 254 (Fig. 21) previously referred to. Upon change of sign in the dividend register the three quarter shift detent 268 is retracted, allowing the left shift clutch 252 to make the last quarter step of its first revolution in the gap 254, during which time the division slide and lever are unlatched by an escapement mechanism which allows these parts to return half way toward normal position, under the influence of the division lever spring 292, Fig. 11.

Figure 21:
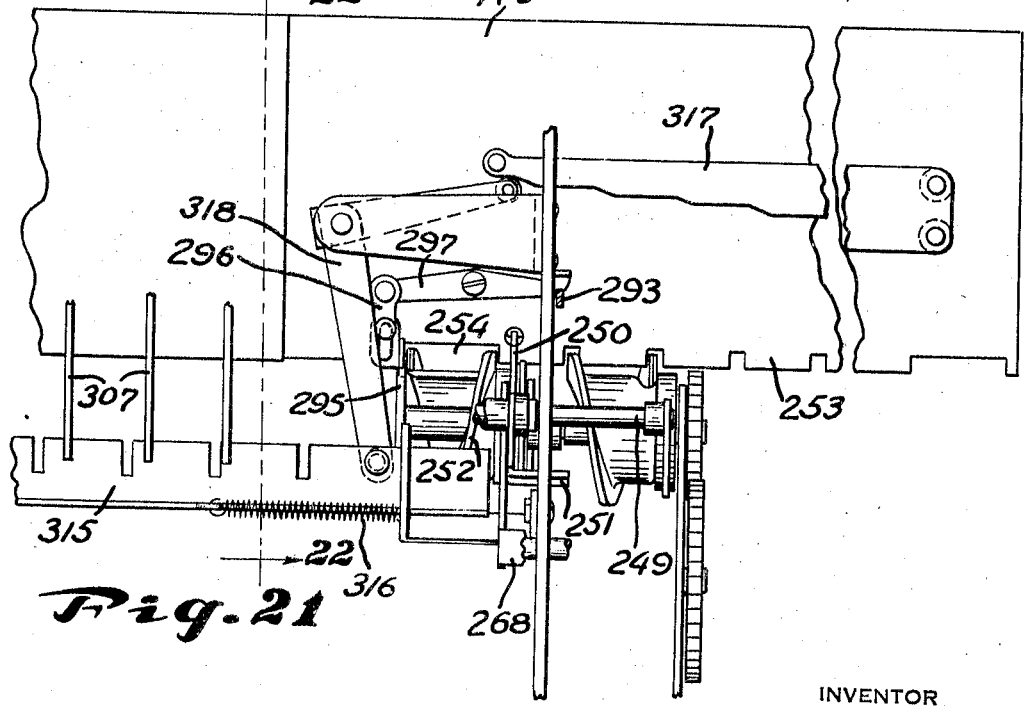
Fig. 21 is a rear elevation of the carriage shift worms and vernier slides.

When the division lever and slide 213 were set they were held in active position by latch 293, engaging shoulder 294 of slide 213. An arm 295 (Figs. 21, 22) secured to the left shift worm 252 is adapted, when the carriage lies in its extreme left hand position, to lift a slide 296, pivotally connected to a lever 297, fulcrumed on the back plate of the carriage 479. The free end of lever 297 is provided with a lug overlying the forward end of latch 293, when the carriage is in this position, as seen in Figs. 11 and 21, so that latch 293 will be lifted from shoulder 294 during the last quarter of the first revolution of the left shift clutch after the carriage is returned to the extreme left. An escapement pawl 298 (Fig. 11) cooperates with latch 293, engaging a lug 299 formed on division slide 213 a little before the division slide has made a half step return toward normal. After arm 295 passes slide 296 the latch 293 may drop into engagement with a shoulder 300 of division slide 213, holding the division slide and lever half returned, in which position the several controls are set to effect a final corrective cycle of operation, where this is needed.

The left shift clutch and worm are allowed to make a second revolution in this extreme shifted position, a spring impelled latch 301 (Fig. 11) acting to hold bell crank lever 248 in active position until the final restoration of slide 213 to normal position, during which step a pin of latch 301 will encounter a cam shoulder of the slide, and bell crank lever 248 will be released. It will be recalled that bell crank lever 248 serves to hold the normal left shift clutch detent 250 out of active position, so that rotation of the carriage shift worm will not be interrupted by that detent until the final release of the division slide 213.

The control bars 227, 228 are again opened during the last quarter of the first idle revolution of the shift clutch, permitting the engagement of the significant catch pawl 222 between the bars, but the cut off levers 235 were disabled during the first half step of return of the division lever, so that now the significant dividend wheel is not necessarily related to the highest digit of the divisor, but may be any wheel of lower order. In other words, it has so far been sufficient for the mechanism to function with relation to so much of the dividend value as may serve to approximate the quotient digit being calculated, but now the correct registration of the final quotient digit will require consideration of the entire dividend value, the control being taken from the highest order dividend wheel substantially displaced from 0 registering position.

A corrective additive cycle is made only if the dividend is negative (complemental). Therefore, means are set during the first half of the return movement of the division lever to disable the minus cycling ram 257. A guide pin 302 (Figs. 11 and 14) is fixed in the left side frame plate to guide the plus cycling ram 258, which is normally held against this pin by the spring 266. A similar pin 303 is provided for the minus cycling ram, this pin being mounted on a lever 304, fulcrumed on the frame plate and provided with a second pin underlying the lower edge of division slide 213. Normally, and with the division slide half returned, the pin of lever 304 engages a shouldered portion of slide 213, holding the minus cycling ram toward the rear of the machine, removing the lower end of the ram pawl 259 out of engaging position with lug 261 of reversing clutch lever 111. (In the fully set position of the division slide the shoulder of said slide will be withdrawn from the pin of lever 304, so that the minus cycling ram 257 will take its active position as shown in Fig. 14.)

A change of sign in the dividend register will now effect operation of the rams, but, since only the plus cycling ram 258 is active, no registration will be initiated if the numeral wheels stand at zero or with a positive remainder. In the case of a negative remainder, a single cycle of operation will effect the correction, and a second signal will bring the actuators to rest.

There must be no mid-cycle reversal during this final corrective operation, and the mid-cycle reversal mechanism is disabled during the first half of the return of the division lever to normal position by the release of pawl 282 by the division lever roller 283.

Upon the completion of the corrective cycle of operation the numeral wheel reading will be 0, or it will consist of a positive value registration (remainder). In either case, no further registration will occur, since the numeral wheels 217 and lever 304 will hold the ram pawls 259, 260 out of active position. At the end of the second cycle of the carriage shift mechanism, the latch 293 will again be tripped, allowing division slide 213 and the parts still held adjusted thereby to return to their normal positions.

If the final corrective cycle is not wanted, the shoulder 300, the escapement pawl 298 and the lever 304 may be omitted; also the hereinafter described modified form of the final corrective cycle mechanism, which is shown in Fig. 26, would not be used.

*Registration of the quotient*

In order to register the quotient in this machine, means must be provided whereby the cycle counting register may be operated while the carriage is shifting three-quarters of a step. The counting register may be located either in the shiftable carriage, or, as here shown, in the base of the machine.

The counting wheels 305 (Fig. 2) are similar in design to the dividend wheels 473, and are equipped with similar tens transfer mechanism, which must be shifted into position for crawl registration during machine operation. The transmission gears 306, corresponding to the gears 480 of the dividend register, need not be transversely elongated, since these gears remain in fixed position with relation to the counting fingers 307. A spring impelled click pawl 308 is provided for each gear 306, to hold it in position after it has been moved by the counting finger.

For the purpose of lifting the intermediate transmission gears 309 into crawl carry position a bell crank lever 310 (Fig. 11) is fulcrumed on the left side frame plate, and is adapted to be contacted by the pin 247 of the division slide during the first half of the setting movement of the division lever, bell crank lever 310 serving to lift a universal bar 311, having an action corresponding to the previously described bar 489.

A series of counting fingers 307 is provided, as shown in Fig. 21, there being one finger for each counting wheel, provision being made whereby but one of these fingers may operate at a time.

An eccentrically operated shaft 312 (Fig. 2) is driven in division operations to register additively on the quotient register whenever the dividend wheels are rotated subtractively, and vice versa. This shaft may be driven from any cyclically driven element of the machine, and the customary reversing gears and change lever mechanism may be provided in order that the relative direction of rotation of the counting wheels and the dividend (product) wheels may be reversed in multiplication as in contrast with division operations.

The counting fingers 307 are pivotally and slideably supported upon a rod 313, and shaft 312 works in open slots of the counting fingers, the latter being urged toward the gears 306 by springs 314, this arrangement permitting the disabling of the counting fingers which are not active in any particular position of the register carriage 479.

All but a selected one of the counting fingers are disabled by means of a vernier slide bar 315 (Fig. 21), mounted in the base of the machine and provided with notches which are spaced somewhat more than one step of carriage shifting movement apart. A spring 316 serves to shift the vernier slide toward the left (toward the right as seen in Fig. 21, which is a rear view), this movement being controlled by a stepped cam plate 317, rigidly mounted on the rear plate of the carriage 479, the cam steps of this plate being brought successively into engagement with a roller fixed in one arm of the bell crank lever 318 fulcrumed in the frame of the machine, and having pin and slot connection in its other end with the vernier slide. As shown in Fig. 21 the carriage and the vernier both stand at the extreme left (right in the drawings), and the counting finger 307 at the extreme right of the series (not shown) is assumed to be in register with its notch in the vernier slide. The stepped plate 317 is so designed that the vernier slide will be shifted during the one-quarter step of the carriage shift during which no cycling may occur, and to provide for a shifting of the slide which, if there are ten counting wheels in the machine, will equal a movement one-ninth as great as that of the register carriage. Thus, for instance, it will be noted that the counting finger 307 at the extreme left of the series (right in Fig. 21) will be held out longer than any of the other fingers, and will register with a notch of the vernier slide when the carriage has moved to its extreme right hand position. The counting fingers 307 which are held inactive by the vernier slide will occupy the position illustrated in Fig. 2.

*Example of operation*

The following example will serve to illustrate the operation of the mechanism hereinbefore described in computing a division problem:

$$\frac{\$837{,}282.31}{92} = \$9{,}100.89^{43}/_{92}$$

With the carriage at the extreme left, the amount 837,282.31 is set in the keyboard and added in the register 473 by touching the plus bar. The keyboard and the quotient register 305 are then cleared and the divisor 92 is set in the right hand columns of the keyboard.

The carriage is now shifted toward the right by depressing the known carriage shift key. With a machine constructed according to the present invention, no precise location of the factors will be necessary, the operator merely placing the left hand digit of the dividend above the left hand digit of the divisor, or anywhere to the right thereof.

Pushing of the division lever 210 rearwardly will now start shifting of the register carriage toward the left, the carriage shifting means in turn starting a registering operation, through the action of the minus cycling ram 257, the action starting immediately if the carriage is properly positioned or otherwise starting as soon as the carriage is moved into the first computing zone.

The condition of the dividend wheels at the beginning of the operation is illustrated in Fig. 41. The figures to the left of each decimal point represent the value entered in the wheel by a related differential actuator, while the figures to the right of such points represent the fractional registrations resulting from tens transfer values registered on the lower order wheel. If lost motion and minute inaccuracies of the parts were eliminated this dividend value would read as:

0.83728231    8.3728231    3.728231    7.28231
2.8231    8.231    2.31    3.1    1.

However, in Fig. 41 the tenths and hundredths values only are shown, since a value of less than one hundredth may be ignored.

It has been seen that, since the dividend was registered positively, the machine is started in subtraction, and the figures on the second line of the diagram (Fig. 41) show the amount subtracted from each of the three left hand dividend wheels during a single cycle of operation. In explanation of these figures it may be said that the value of 90 of the divisor was entered in the slides as —100 +10, the unit 2 being set up normally. Thus the actuator setting represents —1 +1 —2. In each cycle, however, a fractional value will be carried up to each of two higher order wheels, so that the entire registration will be $$\begin{array}{r} -1.00 \quad +1.0 \quad -2 \\ -\ .2 \\ \hline +0.8 \\ +\ .08 \\ \hline -0.92 \end{array}$$

At the end of the first subtractive cycle, it will be seen from the diagram that the left hand wheel registers 9.91, the wheel being displaced nine hundredths of a figure space from zero registering position, presumably an insufficient movement to give a controlling signal. Consequently the machine continues to run subtractively for another half cycle, the values subtracted being —0.46 +0.4 —1, giving a registration in the left hand wheel of 9.45. By this time a signal has been given, and the actuators are returned to the previous full cycle position, giving one minus cycle of operation for the computation in this computing zone. The arrow (Fig. 41) indicates a shift of the register carriage toward the left (which is equivalent to shifting the divisor toward the right), in which position, the registration now being negative, the plus cycling ram 258 will operate to restart the actuators in additive rotation. It will be noted that a single cycle of additive registration will result in the same values being transmitted to the numeral wheels as in the case of the cycle of subtractive registration, except that the sign of each registering movement is reversed. Assuming that the registration of 0.09 in the wheel now lying immediately to the left of the cut off mechanism will not give the controlling signal, another half cycle of additive operation is performed, advancing this wheel to 0.55. A signal will have occurred at this time, and the actuators will be stopped and returned to the previous full cycle position, as before, the carriage then shifting again to the left. In this third computing zone a —1 quotient digit will be computed as previously described, giving a registration on the three active wheels of 0.00, 0.08 and 0.82, so that as the carriage moves into the fourth zone the wheel registering 0.08, being insufficiently displaced from zero, will give no cycle initiating signal, and the carriage will continue to shift to the fifth zone, having in effect registered a quotient digit value of 0 in the fourth zone. In the fifth zone we find that the controlling dividend wheel registering a value of 0.82, and consequently cycling is initiated in a minus direction. The three remaining quotient digits are computed as before, leaving a plus remainder of 43 on the numeral wheels when they assume their aligned reading position, as the machine comes to rest upon return of the division key to its normal position.

In the successive computing zones of the carriage, the machine has made

—1 +1 —1 0 —1 +1 +1 cycles ignoring the half cycles which were cancelled by return movement of the actuators, this sequence registering the value 9 1 0 0 8 9 on the quotient register, by virtue of the tens transfer mechanism with which it is equipped.

It may be noted that a net of six cycles, or a gross of eleven cycles including half cycles of overrun and return have been made, as compared with a minimum of thirty-nine cycles in the previous machines which subtract to an overdraft, correct, and shift into the next place. It is also to be noted that less actuator movement would be involved in problems calling for an interruption of cycling at full cycle position, instead of at mid cycle position, as in the example above set forth, the saving resulting from the absence of actuator movements to mid cycle and return, which have a net value of zero. In the average run of work, interruption of cycling will occur as often at full cycle as at mid cycle.

The possible saving resulting from this invention is greater than a comparison of the number of machine cycles would indicate, since cycling runs concurrently with carriage shifting. In the example illustrated, the cycling in each place may be effected while the carriage is shifting, so there would be no interruption in the movement of the carriage toward the left, in which case the time of machine operation would be merely the time required for a continuous shifting of the carriage to the extreme left.

*Modified stopping mechanism*

Fig. 24 shows a modification of the mechanism shown in Fig. 15, similar parts being designated by the original reference numbers, characterized by the exponent *a*.

The mechanism previously described is adapted to trip the trigger 31 after the controlling dividend wheel has passed through zero. The purpose of this modification is to effect the tripping of the trigger by the final movement of the dividend wheel to zero, an instant before the movement beyond zero occurs. The control bars 227a and 228a operate as previously described, one of the bars being held in "open" position until the significant dividend wheel is brought to zero. The rams 272a and 273a, which are interchanged in position as compared with rams 272 and 273 of Fig. 15, are extended forwardly so as to normally lie beneath lug 277a of the trigger 31a. Therefore, during the cycling of the machine the ram connected with the closed control bar will be held in inactive position, while the free end of the ram connected with the open control bar will lie opposite lug 277a, ready to trip trigger 31a the instant the sensing levers are adjusted by the cam related to the significant dividend wheel.

*Modified starting mechanism*

Figs. 25 and 26 show a modified mechanism which eliminates the ram pawls 259, 260 of Fig. 14. Similar parts are designated by the original numerals, modified by the exponent *b*.

Elimination of the ram pawls 259 and 260 is effected by reversing the movement of the control bar lugs 264 and 265. In the modified form, movement of either of the lugs 264b or 265b toward the other lug will bring the end of the related ram 257b or 258b above the lug 261b or 262b of clutch lever 111b. To effect this change, the position of the minus control bar 227b and plus control bar 228b is reversed as compared with the position of bars 227 and 228. Further, the cam 217b occupies a position displaced 180° from the position of cam 217, the numeral wheel 473, 473b being located in zero registering position both in Fig. 2 and in Fig. 25. Spring 266b, which closes the control bars, is attached directly to these bars in the present modification.

*Negative dividend modification*

Fig. 26, in addition to the modified starting mechanism, shows means used in connection with the automatic determination of a quotient with a dividend entered either positively or negatively into the dividend register.

In order to effect a calculation under either of these conditions, it is necessary to register the quotient either unlike the sign of the dividend registration, as hereinbefore set forth, or like the sign of such registration, as in multiplication. It is also necessary to start the first computation either subtractively or additively, according to the sign of the dividend, and to terminate the registration of the last quotient digit correctly. Of course, the sign of the quotient may be determined by manually setting the customary change lever to the appropriate position, but it will be apparent that certain types of automatic change gearing may be built into the machine for the same purpose, an example of such gearing being disclosed in the German Patent No. 346,781, issued to Gustav Schwermer on January 7, 1922. Also, two counting registers, operating according to opposite signs, are known in the art (for instance, in certain models of the known Monroe calculating machine), and if two such quotient registers were employed there would be no necessity for adjusting a change lever.

It will be obvious from what has been said hereinbefore that the present mechanism will always start a quotient digit calculation correctly, in accordance with the sign of the dividend, this requirement being inherent in the design. It will also be obvious that if the final corrective cycle mechanism is omitted, as was suggested, the machine will also compute the last quotient digit with the same degree of accuracy whether the dividend was at first a positive or a negative value. However, where this final corrective cycle mechanism is used, it will be necessary not only to effect a corrective additive cycle, when that is called for during the computation of a normally registered dividend, but also to effect a final subtractive corrective cycle when that is called for during the computation of a complementally registered dividend. The following means may be provided for this purpose:

A lever 304b is fulcrumed upon a bracket 319, secured to the machine frame, and is provided with a laterally extended free end lying between the rams 257b and 258b so that rocking movement of said lever, to one side or the other, will operate to hold one or the other of said rams out of active position. A final cycle switch 320 is pivoted on division slide 213b and is held centralized when said slide is in normal position by contact of a cam portion 321 of said switch with suitable rods or shafts fixed in the machine frame. The switch is also held in centralized position, after the movement of the division slide to active position, by means of a spring click pawl 322, pivoted upon the division slide. As the slide is set to active position by the division lever, a nose 323 of switch 320 will be moved into the path of a tooth 324, fixed upon a cyclically driven shaft 325 (Fig. 9). During additive rotation of the machine shaft 325 will rotate counter-clockwise, as seen in Fig. 26, while during subtractive rotation the shaft will rotate clockwise, and during the first cycle of machine operation tooth 324 will displace the switch, in one direction or the other. A spring latch 326, mounted upon the division slide will move into engagement with a shoulder of switch 320 as said switch is set by tooth 324, to hold the parts in set position.

The lever 304b has a pin in its upper arm, engaging a slot formed in the switch 320, this slot being widened at its rearward end, so that while the division slide is fully forward, switch 320 will have no control of lever 304b, and there will be no interference with the normal operation of the rams 257b, 258b. When the division slide is returned half way to normal position, before the time in which the final corrective cycle is to be made, the narrow portion of the slot of switch 320 will serve to locate the pin of lever 304b, swinging said lever in one direction or the other, according to the position in which the switch is held by latch 326. If the dividend was entered normally, the first rotation of shaft 325 will have been subtractive, or clockwise, and switch 320 would be latched in raised position, acting to bring the lower end of lever 304b into contact with ram 257b, so that subtractive setting of clutch lever 111b would be prevented, and additive setting permitted when a corrective cycle of operation is called for. In the case of a negatively entered dividend, the initial rotation of shaft 325 will be counter-clockwise as seen in Fig. 26; switch 320 and lever 304b will be set in the opposite direction; ram 258b will be disabled; and the final corrective cycle will be subtractive.

During the last half step of the return of division slide 213b, the latch 326, which is pivoted upon the division slide, will encounter the fixed pin 246b and will be retracted, permitting switch 320 to be centralized by the action of the cam portion 321.

No clearout means for the numeral wheels 473 has been shown. Obviously, the wheels may be cleared by copying the registration to the appropriate columns of the keyboard and making a subtractive registration, and it may also be stated that clearout means appropriate to these wheels are known in the art.

*Modification for electric circuit control*

The electric circuit control means illustrated in Figs. 27 to 40 inclusive operate on the same principles hereinbefore described in relation to the mechanical control. The parts shown in Fig. 15 are not used in this modification. Briefly, current conducting rods replace the plus and minus control bars 228, 227 of the previously described form, these rods being selectively connected with contacts controlled by the numeral wheel. The circuits so established operate plus and minus solenoids controlling the related cycle initiating rams.

Since current must flow in these circuits instantly they are closed, direct current is essential. The circuit diagrams (Figs. 37 to 40) include conventional representations of a full wave rectifier and a condenser, as a source of direct current from an alternating current power line, these elements being omitted if direct current is otherwise available.

During the movement of the division lever 210' toward its operative position, a master contact 327 (Figs. 30 and 38) is closed, permitting current to enter a conducting rod 328 (Figs. 27 and 38). Since it is desired to close contact 327 late in the setting stroke of the division lever and to open the contact late in the restoring stroke of the lever, the contact closing arm 330 has pin and slot connection with the division lever 210', providing for the necessary lost motion. A contact 329 (Figs. 31, 37 and 38) is also provided in the return circuit, this circuit being closed when the clutch yoke 111' is brought into its centralized neutral position.

The conducting rod 328 is electrically connected with a series of contact members 331 (Figs. 27, 28 and 36) by means of springs 332. There must be a contact member 331 at least in each order of the machine in which there may be a digital actuation, which includes the order at the left of the highest order of keys 18. Each contact member 331 must have mating elements capable of being brought into contact therewith under the control of the numeral wheel of the related order, to give a plus or a minus sign signal which may control the initiation and termination of each registering operation in division calculations. These mating contact elements will now be described.

Plus signal and minus signal contact levers 333 and 334 (compare Figs. 27, 28 and 33) are pivotally supported in the frame of the machine and are each provided with a contact adapted to engage the plus and minus contacts of the related member 331. The contacts of levers 333 and 334 are electrically connected, by means of springs 335, with conductor rods 336 and 337 respectively. Minus operation solenoid 338 (Figs. 29 and 38) is in circuit with the rod 336 and plus operation solenoid 339 is in circuit with the rod 337, these solenoids operating a lever 340 in one direction or the other, said lever being provided at its upper end with an extension lying between the minus and plus ram pawls 259', 260', corresponding to the pawls 259 and 260 illustrated in Fig. 14.

Contact levers 333 and 334 are provided with upper beveled extensions adapted to engage the lower ends of sensing levers 341 and 342, pivotally mounted in the register carriage and cooperating with the cam 343. A cam 343 and a pair of sensing levers 341, 342 are provided for each numeral wheel, so that at any instant during the registering action in a division operation, the contact levers 333 and 334 in all orders of the machine are positioned by the cams 343 of the respectively related numeral wheels, as may be seen in Figs. 38 to 40.

When the machine is in its normal position of rest levers 333, 334 are held in the position illustrated in Figs. 27 and 37 by means of a universal bar 344, pivotally supported from a shaft 232' which is operated in the same manner as shaft 232 illustrated in Figs. 2 and 11, except that its angular movement is less. This permits the levers 341 and 342 to fall freely away from the cam 343. Upon setting of the division lever and consequent upward movement of bar 344 the springs 335 will lift the levers 333, 334 and move the sensing levers 341, 342 toward the cams 343. In the present embodiment of the invention sensing levers 341, 342 act independently, each to impart its own sign signal, lever 341 being a plus signal lever and 342 being a minus signal lever, and either lever being displaceable from zero position to plus or minus signalling position respectively. This arrangement not only reduces the lift required by the cam 343 but provides a locator action which will prevent a false signal from a numeral wheel at the left of the highest divisor digit which should be approximately at naught, but which may be slightly displaced because of back lash in the gear train. This location will be effected when universal bar 344 is lifted by means of the springs 335 and levers 341, 342 acting upon the cam slopes of cam 343. Levers 341 and 342 are stopped accurately in zero position, and out of contact with the low point of cam 343 by means of stop rods 345.

Hold out mechanism is provided as in the mechanical form of the invention, to prevent a signal from any numeral wheel except the one of highest order which is displaced substantially from its zero position.

The principal element of this hold out mechanism comprises a series of levers 235' (Figs. 27, 28 and 32) mounted on eccentric collars 346 fast upon the shaft 236'. The purpose of this eccentric mounting will be hereinafter described.

A lever 235' is interposed between each pair of levers 333, 334, and the contact member 331 of next lower order, the forwardly extending arm of each contact member 331 underlying a lug 365 formed on the forward end of an arm of the lever 235', the spring action of member 331 impelling the extension 364 of lever 235' upwardly against one or both of the levers 333, 334. The height of this extension 364 is sufficient to hold all of the contacts on members 331 apart from the contacts on levers 333, 334 whenever all of the latter levers stand in line in their upper or in their lower positions, except that there is no lever 235' at the left of the member 331 of highest order, so that when all of the levers 333 and 334 are normally held depressed by the universal bar 344 as shown in Figs. 27 and 37, member 331 of highest order may contact with levers 333 and 334 of that order, but since the master contact 327 is open whenever bar 344 is in its lower position, no current can pass. A fixed stop (not shown) is provided to prevent the contact member 331 of highest order from following levers 333, 334 upwardly when they are lifted at the initiation of a division operation.

The lug 365 of each lever 235' also overlies a tooth 366 of the next lower order lever 235', providing the overlapping tails which are essential to the hold out action.

This arrangement provides that during a division operation, throughout which universal bar 344 remains lifted, all of the levers 333 and 334 at the left of the highest effective dividend digit stand in line in their upper positions, and that all of the contact members 331 of lower order stand in line in their lower positions (see Fig. 39). Only in the order of the highest effective dividend digit does the lever 333 or 334 stand depressed and the contact member 331 lifted, as required to close a contact (see Figs. 38 and 39).

In the description of the mechanical form of the invention, members 223 and 235 were spoken of as the "hold out" and "cut off" levers respectively, for purposes of easy identification. Actually these members are not independent of one another. The hold out effect will function without levers 235, but the cut off effect involves both (through the interconnecting slide 230), and it was only for purposes of mechanical convenience that they were shown as separate parts. Theoretically the two levers and the slide might have been made as a single part, as in fact they are in the embodiment of the invention now being described, in which the lever 235' performs all of the functions of the members 223, 230 and 235 of the main form.

The levers 235' are eccentrically pivoted on the shaft 236' to provide the cut off action which prevents the closing of any contacts at the right of the highest divisor digit. Shaft 236' is rocked clockwise about 90° during the last half of the setting movement of the division key, by means of a segment 347 (Fig. 29) engaging a pinion on said shaft, the segment being operated by pin 348 fixed in the division slide 213'. As shown in Figs. 27 and 28, a rearward transverse portion of each lever 235' overlies notched or cut away portions of the setting slides 46', 48' and 50', when these slides are in unset or zero position. It is to be remembered that the universal bar 344 moves upwardly before shaft 236' is rocked, so that at the instant shaft 236' starts to rock clockwise, all of the levers 333 and 334 stand in positions in accordance with the positions of the cams 343 respectively related to them. So if the division lever 210' is set with all the numeral wheels 473 at zero (which would not be done in actual work), all of the contact levers 333 and 334 would be lifted during the first half of the setting stroke, and at the same time all of the levers 235' would rotate clockwise on the eccentric collars 346 so that the rearward transverse portion of each lever 235' would be lowered to barely clear such slides 46', 48' and 50' as might be set according to some divisor value installed in the keys 18. Now during the last half of the setting stroke of the division lever 210' during which the shaft 236' and the eccentric collars 346 are rocked clockwise, the rearward transverse portions of each lever 235' would drop into the notches of the related slides 46', 48' and 50' in all orders of the machine in which no key 18 is depressed, the forward ends (lugs 365) remaining upwardly, as held by the springs 332 of the contact members 331. In the orders in which a key 18 is depressed, and one or two of the slides 46', 48' and 50' displaced from normal, the rearward transverse portion of the lever 235' of that order cannot enter said notches so cannot be depressed. Consequently the forward ends of that lever would be forced downwardly, lug 365 rocking the contact member 331 of next lower order counterclockwise, and through the previously described overlapping tail effect, also similarly rocking counterclockwise all levers 365' and contact members 331 of lower order. Thus the contact member 331 in the highest order in which a divisor key 18 is depressed, and the similar members in all higher orders, stand in their uppermost positions, and all of the contact members 331 of lower order stand in their lowermost positions. However, since all of the contact levers 333 and 334 stand in their upermost positions (the numeral wheels 473 all being at zero) all electrical circuits remain open, and no signal is given to initiate registering operations. Therefore the carriage runs uninterruptedly to its extreme left position, where idle rotation of the carriage left shift worm 252 releases the division lever 210' and returns all parts to their normal position of rest as previously described, no registrations having been made.

If, on the other hand, certain of the numeral wheels 473 had contained a dividend value when the division lever 210' was moved into operative position, certain of the contact levers 333, 334 would have stood depressed. Whenever a depressed contact lever 333 or 334 mates with a raised contact member 331, the circuit is closed (see Figs. 38 and 39), and a signal is given which initiates digital registration, such registration continuing until an opposite sign signal is given by the running of the dividend value through zero.

At the instant the division lever 210' is fully set into active position, with a plus sign dividend in the numeral wheels, the differential actuators are at rest, the clutch 111' centralized, and the switches 327 and 329 closed. Since the dividend is a plus value, the numeral wheel of highest order sufficiently displaced from zero to be capable of giving a signal stands in its plus range, displacing sensing lever 341 and holding lever 333 in electrical contact with the member 331. This will establish a circuit through solenoid 338 and thereby rock lever 340 clockwise as seen in Fig. 29, bringing ram pawl 259' into active position. Now upon action of the cam on the carriage shifting clutch (previously described) the rams will be operated and the clutch engaged for subtractive operation.

In the form of the invention shown in Figs. 1 to 23 inclusive, the cut-off lever was operated by the setting slide or slides representing the highest digit of the divisor set in the value entering devices of the machine. Thus, when a left hand divisor digit of a value from 5 to 9 was set up in the keyboard, and thereby a digit value of 1 was set in the next left hand column, according to the semi-complemental system of registration, the cut-off operated to disable a signal from the numeral wheel opposite the highest order depressed key as well as from a numeral wheel located to the right of said key. This was necessary because no mechanism was shown which would give a correct mid cycle actuation interrupting signal from a wheel rotated in a direction opposite to the sign of the calculation being performed, this being true of the wheel opposite the highest order divisor key, if said key has a value of 5 to 9. Means for giving a correct signal under these circumstances is shown in connection with the present form of the invention. Consequently the cut-off is arranged to allow the transmission of a signal from the wheel opposite the highest order depressed key, by providing that the transverse portion of each lever shall overlie the related slides 46', 48' and 50', but not the slide 52', as shown in Fig. 28.

The reversely or complementally driven wheel is always correct at the completion of a registering cycle, whereas in half cycle position it is 180° opposite to the position which it will occupy in normal registration. The interruption controlling signal is, therefore, made effective only at full cycle and at half cycle position of the actuators, and the sign character of the controls operating at mid cycle is inverted, so that a position of the controlling wheel which would give a plus signal at full cycle will give a minus signal at half cycle position of the actuators.

To effect this inversion of the signal, a series of contact members 349 (Figs. 27, 28 and 35) is provided, loosely mounted upon shaft 236', and being in all respects similar to members 331 except as follows:

The member 331 is provided at its rearward end with a lug 367 (Figs. 28 and 36) normally overlying a notch 368 formed in the slide 52' which permits the member 331 to function as above described in the order of the highest divisor key if that key has a value of 1 to 4. If, however, the highest divisor key is 5 to 9, the slide 52' is shifted rearwardly to move its notch 368 from beneath lug 367, the slide thus holding the forward end of contact member 331 out of range of its related levers 333, 334. The member 349 has a longer rearwardly extending arm carrying the lug 369 (Figs. 28 and 35) which may drop into the notch 368 whenever the slide 52' is set for complemental registration of a digit 5 to 9, permitting contact member 349 to act in lieu of member 331.

The contact points of member 349 close with a separate pair of contact points, one on the lever 333 which is electrically connected with current conducting rod 350, and one on lever 334 passing current to the rod 351. These rods are connected with the terminals of a two-way switch 352, controlled by a cam 353 (Fig. 29) fast upon shaft 199' of one of the actuator drive pinions, this shaft rotating a third of a revolution during each cycle of the machine. Cam 353 is so designed that when the differential actuators stand at full cycle position, a follower lever 354 will hold switch 352 in position wherein contact is established between rods 350 and 336, and between rods 351 and 337, as shown in Figs. 37 and 38. At half cycle position, however, cam 353 will hold switch 352 in the position in which rod 350 is connected with rod 337, and rod 351 with 336, as shown in Figs. 39 and 40, whereby the sign of the signal will be reversed.

The functioning of the contact member 349 and the action of the two-way switch, therefore, provides that whenever the dividend wheel related to the highest divisor key is rotated reversely, a normal signal shall be given at full cycle position just as would be given by the member 331 if it could act, but that the opposite sign signal which is given at mid cycle position is inverted by the two-way switch to act as a normal signal.

When the actuators are started, switch 329 is opened, and simultaneously one of two switches 355, 356 (Figs. 29 and 37 to 40) is closed. The same insulated roller 357, mounted in the clutch lever 111', which controls the switch 329 is designed to operate switch 355 or switch 356, according to the direction in which lever 111' is displaced from its neutral position. Switch 356 connects the plus signal rod 336, and switch 355 connects the minus signal rod 337, with a return circuit in which a solenoid 358 is interposed, this solenoid controlling interruption of the registering operation.

The impulse for lifting the stopping pawl trigger 31' is derived from a toothed disk 359 mounted upon the shaft 199', which drives it by means of a pin and slot lost motion connection, the disk being so designed that a tooth of the disk will displace a three-armed lever 360 each time the actuators pass through half cycle, and again as they pass through full cycle position, it being remembered that if the actuators are to be reversed or stopped, they always overrun these positions to some extent. Lever 360 has operating connection with a bell crank lever 361, upon the upper end of which is mounted a spring retracted pawl 362, having a normal path of movement out of contact with the lug 277' of trigger 31'. Upon energization of the solenoid 358, however, a lever 363 will be operated, this lever contacting with the tail of pawl 362 and serving to hold the pawl in position to engage lug 277', upon operation of lever 360. The pin and slot lost motion connection, by means of which the toothed disk 359 is driven, serves two purposes. As explained above, the cycle interruption signal should preferably be given at the instant the controlling dividend wheel registers a value of zero. Since the mechanism shown gives such a signal an instant later, as the registration departs from zero value, a slight time lag in the tripping of the trigger 31' will to some degree compensate for this slight lag. Furthermore, as is well known, there is a minute lagging action in the response of solenoids to the closing of the circuit, and this delay also partly compensates for this. The amount of lag will depend to some extent upon the construction of the parts, and may be adjusted as needed.

When the actuators come to full cycle position during a subtractive operation, no signal will be transmitted so long as the controlling dividend wheel shows a plus registration, because switch 356 is open, but switch 355 being closed, a change in this wheel to minus registration will energize solenoid 358, and trigger 31' will be raised, and the actuators brought to rest. As the actuators come to half cycle position during such subtractive operation, the same control will be exercised, except that the signal for a change from positive to negative registration will be transmitted through sensing lever 342 if the controlling wheel is driven positively or through sensing lever 341 if the controlling wheel is being driven complementally.

Trigger 31' being raised for interruption of cycling at mid cycle position, the differential actuators will be stopped and clutch lever 111' will be moved to neutral position, as hereinbefore described, thus opening switch 355 or 356 and closing switch 329. The reengagement of the clutch yoke 111' to return the actuators to normal position and the second tripping of the trigger 31' to stop them there may be effected as in the first described form of the invention. It will be noted that if the reversal of the drive at mid cycle is effected by the mechanism shown in Fig. 16 instead of by the mechanism of Patent No. 1,888,161 above referred to, the inversion of the mid cycle signal from a complementally driven controlling wheel will act to energize solenoid 338 or solenoid 339 as may be required at this time.

Figures 37 to 40 inclusive show the wiring diagram of the machine, with the contacts in the positions which they assume with the machine at normal and at the instant of the flashing of controlling signals.

In each figure the dividend is shown in figures above the diagram and the divisor by figures in the lower part of the diagram. The larger dividend digit at the left of the decimal point is the dividend digit of that order. The smaller figures at the right of the decimal represent the fractional position of the numeral wheels resulting from the crawl carry operation.

In Figures 37, 38, and 39 the example is 10,401.÷32., and in Figure 40 it is 21,107.÷62, the different figures illustrating intermediate stages of the computation.

In Fig. 37, the contacts on levers 333 and 334 all stand in their lower position, being held depressed by the rod 344. As previously explained, all of the contacts on the levers 349 and 331 are also held in their lower position by the overlapping tails of the levers 235', excepting the contacts on the lever 331 at the left of the keyboard which is closed with the contacts on 333 and 334 above it but no current is flowing because contact 327 is open.

Fig. 38 illustrates the position of the contacts at the instant of the flashing of the cycle starting signal. The contacts on the levers 333, 334, 349 and 331 have all been set and the contact 327 closed, passing current through the solenoid 338 to initiate cycling in a minus direction. The carriage left shift clutch is just starting, but the clutch yoke has not been thrown, and machine cycling has not yet started.

Fig. 39 shows the position of the contacts at the instant of the first signal for interrupting machine cycling in the same example. When cycling started the contact 329 was opened and the contact 355 closed to pass an overdraft signal when one shall occur. In this case the overdraft occurred in the first half of the fourth cycle so that at the middle of that cycle current will be flowing through the cycle interrupting solenoid 358, as shown, and the machine will be reversed, returned to full cycle, and a carriage shifting into the next decade initiated—as in the mechanical form of the invention.

Fig. 40 differs from Fig. 39 in that the cycle interrupting signal comes from a complementally driven wheel and thus must be inverted. The overdraft has again occurred in the first half of the fourth cycle; at the middle of that cycle the arithmetical value of the dividend is 999407. If the controlling wheel were driven normally instead of reversely, it would at the instant stand at 9.407, but being reversely driven it stands at 4.407, for reasons previously explained, with the cam 343 in the plus range so that a plus sign signalling current is passed to the conductor 350 but from there it passes through the mid cycle pole reversing switch to the minus lead 337 where it in effect becomes a minus or overdraft signal, passing thence through the contact 355 which stands closed on the minus circuit side, and through the solenoid 358 to interrupt machine cycling at mid cycle, returning the machine to normal and initiating a carriage shift into the next decade.

In case the final corrective cycle mechanism is used in this form of the invention, it will function as in the previously described form since, although trigger 31' may be raised at mid cycle, this would be without effect because of the disabling of the mid cycle reversing mechanism by the partial retraction of the division lever.

I claim:

1. In a calculating machine having a register, cyclic differential actuators operable to register additively or subtractively upon said register, and means for entering values in said actuators; value responsive means adjustable to different positions in accordance with the value in said register, means controlled by said value responsive means to interrupt operation of and to locate the actuators in full-cycle position, said value responsive and interrupting means cooperating in such timed relation with the movement of the differential actuators as to locate the actuators in that full-cycle position in which the algebraic value in said register is approximately equal to half or less than half the algebraic value entered in said actuators, and means controlled by the value responsive means and operable to initiate additive actuator operation when the value in said register is negative and to initiate subtractive actuator operation when said value is positive.

2. In a calculating machine having a quotient register and divisor entering means; the combination with a dividend register and cyclic differential actuators therefor operable to register half the algebraic value of any entered divisor during a given portion of the actuator cycle and the remaining half of such value during a different portion of the cycle, of cycle controlling means operable to terminate a quotient figure registration at the full cycle actuator position in which the lowest algebraic remainder value is registered, including value responsive means invariably operable by said dividend register as certain numeral wheels thereof come approximately to zero registering position, means responding to operation of the value responsive means to prevent effective passage of the actuators from the first named portion of the cycle to the other portion, and means responding to operation of the preventing means to locate the actuators in the previous full cycle position.

3. In a calculating machine having a register, reversible cyclic differential actuators therefor, and a power drive for said actuators; value responsive means operable by said register, means controlled by said value responsive means to release said actuators from the power drive at mid cycle or alternatively at full cycle position thereof, and means controlled by said releasing means and operable in the mid-cycle position of the actuators to control reverse drive of said actuators from mid cycle position thereof.

4. In a calculating machine having a register, reversible cyclic differential actuators therefor, and a power drive for said actuators; value responsive means operable by said register, means controlled by said value responsive means to release said actuators from the power drive at mid cycle or alternatively at full cycle position thereof, means controlled by said releasing means and operable in the mid-cycle position of the actuators to control reverse drive of said actuators from mid-cycle position thereof and release thereof from the power drive at full cycle position.

5. In a calculating machine having a register, and reversible power driven cyclic differential actuators therefor; value responsive means operable by said register, means controlled by said value responsive means and including oppositely movable arms driven in time with said actuators and a lever operable alternatively by one or by the other of said arms to release said actuators from the power drive at mid cycle or alternatively at full cycle position thereof, and means controlled by said releasing lever and operable in the mid-cycle position of said actuators to control reverse drive of said actuators from mid cycle position thereof.

6. In a calculating machine having a register, and cyclic differential actuators therefor; means controlled by said register to interrupt the operation of said actuators at mid cycle or alternatively at full cycle position thereof, said interrupting means including oppositely timed crank driven elements operable respectively to effect the interruption upon passage through a common angular zone, and an elliptic gear driving train for said elements, operable to drive each element at maximum speed through the interrupting zone.

7. In a calculating machine having a register, and cyclic differential actuators therefor; value responsive means adjustable by said register alternatively into one of several controlling positions, means controlled by said value responsive means to interrupt the operation of said actuators at mid cycle or alternatively at full cycle position thereof, said interrupting means including a normally restrained element, intermittently operable, normally ineffective impulse devices, and a member responsive to adjustment of the value responsive means to render the impulse devices effective to release the normally restrained element.

8. In a calculating machine having a transversely shiftable carriage, a register mounted thereon, reversible cyclic differential actuators therefor, and a power drive for said actuators; value responsive means operable by said register, means controlled by said value responsive means to release said actuators from the power drive, including elements effective to accomplish the release at mid-cycle actuator position and alternatively active elements effective to accomplish the release at full cycle actuator position, and means operable in one extreme shifted position of the carriage to disable the mid-cycle releasing elements.

9. In a calculating machine having a transversely shiftable carriage, a dividend register mounted thereon and including numeral wheels, differential actuators operable to register additively or alternatively subtractively upon said dividend register, and a quotient register; quotient registration control means including value responsive means adjustable to different positions in accordance with the presence of a positive or alternatively of a negative registration in the dividend register, control elements invariably operable by said value responsive means as given dividend numeral wheels come approximately to zero registering position to terminate a quotient figure registration, and means cooperating with the value responsive means in each shifted position of the carriage to initiate subtractive registering action of the actuators when the registration is positive and to initiate additive registering action thereof when the registration is negative.

10. In a calculating machine having a dividend register including numeral wheels, differential actuators operable to register additively or alternatively subtractively upon said dividend register, and a quotient register; quotient registration control means including value responsive elements adjustable to different positions in accordance with the presence of a positive or alternatively of a negative registration in the dividend register, a plurality of electric signalling circuits having contacts engageable by the value responsive elements, means controlled by one of said circuits to initiate subtractive registering action of the actuators when the registration is positive and by another of said circuits to initiate additive registering action thereof when the registration is negative, means settable by a third circuit as given dividend numeral wheels come approximately to zero registering position to terminate a quotient figure registration, and switches operable in time with the terminating and with the initiating means to pass current to an operation initiating circuit when the actuators are at rest and to the operation terminating circuit during actuator movement.

11. In a calculating machine having a transversely shiftable carriage, a dividend register mounted thereon and including numeral wheels, differential actuators operable to register additively or alternatively subtractively upon said dividend register and a quotient register; quotient registration control means including value responsive means adjustable to different positions in accordance with the presence of a positive or alternatively of a negative registration in the dividend register, control means invariably settable by said value responsive means as given dividend numeral wheels come approximately to zero registering position to terminate a quotient figure registration, means cooperating with the value responsive means in each shifted position of the carriage to initiate subtractive registering action of the actuators when the registration is positive and to initiate additive registering action thereof when the registration is negative, and means including elements settable to active position by the carriage in the movement thereof into its extreme left hand shifted position and elements cooperating with the settable elements to adjust the value responsive means to initiate additive registering action of the actuators when the registration in such extreme carriage position leaves a negative registration in the dividend register.

12. In a calculating machine having a transversely shiftable carriage, a dividend register mounted thereon and including numeral wheels, differential actuators operable to register additively or alternatively subtractively upon said dividend register and a quotient register; quotient registration control means including value responsive means adjustable to different positions in accordance with the presence of a positive or alternatively of a negative registration in the dividend register, control means invariably settable by said value responsive means as given dividend numeral wheels come approximately to zero registering position to terminate a quotient figure registration, means cooperating with the value responsive means in each shifted position of the carriage to initiate subtractive registering action of the actuators when the registration is positive and to initiate additive registering action thereof when the registration is negative, an operation key, means for starting a division operation upon manual operation of said key, means for latching the key in fully operated or alternatively in semioperated position, means including elements settable by the carriage in the movement thereof into its extreme left hand shifted position and elements cooperating with the settable elements to return the key to semioperated position, and means controlled by the key, so positioned, to adjust the value responsive means to initiate additive registering action of the actuators when the registration in such extreme carriage position leaves a negative registration in the dividend register.

13. In a calculating machine having a transversely shiftable carriage, a dividend register mounted thereon and including numeral wheels, differential actuators operable to register additively or alternatively subtractively upon said dividend register and a quotient register; quotient registration control means including value responsive means adjustable to different positions in accordance with the presence of a positive or alternatively of a negative registration in the dividend register, control means invariably settable by said value responsive means as given dividend numeral wheels come approximately to zero registering position to terminate a quotient figure registration, means cooperating with the value responsive means in each shifted position of the carriage to initiate subtractive registrating action of the actuators when the registration is positive and to initiate additive registering action thereof when the registration is negative, an operation key, means for starting a division operation upon manual operation of said key, and secondary control means including elements settable for selective action by said key under control of the value responsive means, and elements settable to active position by the carriage in the movement thereof into its extreme left hand shifted position, said secondary control means being operable to adjust the initiating means to initiate a final corrective additive or subtractive registering action of the actuators of opposite sign to that of the initial registration following operation of the key.

14. In a calculating machine having a register, cyclic differential actuators operable to register additively or subtractively upon said register, and means for entering a complemental value in said actuators; value responsive signal means adjustable to different positions in accordance with the registering position of a controlling element of said register, means intermittently acting to transmit a signal from the value responsive means at the mid-cycle and at the full-cycle position of the actuators, means operable by the signal transmission means to interrupt actuator operation, means controlled through the signal transmission means and operable following actuator interruption at full cycle position to initiate additive actuator operation when the value in said register is negative and to initiate subtractive actuator operation when said value is positive, and means operable at mid-cycle to adjust the signal transmission means to invert the sign effect of the initiating means and thereby counteract the inverted character of the signal from the complementally actuated controlling register element.

15. In a calculating machine having a register, cyclic differential actuators operable to register additively or subtractively upon said register, and means for entering values normally or alternatively complementally in said actuators; value responsive signal means adjustable to different positions in accordance with the registering position of a controlling element of said register, means intermittently acting to transmit a signal from the value responsive means at the mid-cycle and at the full-cycle position of the actuators, means operable by the signal transmission means to interrupt actuator operation, means controlled through the signal transmission means and normally operable following actuator interruption to initiate additive actuator operation when the value in said register is negative and to initiate subtractive actuator operation when said value is positive, and means settable by the entering means in entering a complemental value and operable at mid-cycle to adjust the signal transmission means to invert the sign effect of the initiating means and thereby counteract the inverted character of the signal from the complementally actuated controlling register element.

16. In a calculating machine having a transversely shiftable carriage, a register mounted thereon and including numeral wheels, differential actuators operable to register additively or alternatively subtractively upon said register, and carriage shifting means having idle movement in one extreme shifted position of the carriage; value responsive means adjustable to different positions in accordance with the presence of a positive or alternatively of a negative registration in the register, control means invariably settable by said value responsive means as given numeral wheels come approximately to zero registering position to activate the carriage shifting means, means cooperating with the value responsive means in each shifted position of the carriage to initiate subtractive registering action of the actuators when the registration is positive and to initiate additive registering action thereof when the registration is negative, and means operable by the idle movement of the carriage shifting means in extreme shifted position of the carriage to adjust the value responsive means to initiate additive registering action of the actuators when the previous registration in such extreme carriage position leaves a negative registration in the register.

17. In a calculating machine having a transversely shiftable carriage, a dividend register mounted thereon and including numeral wheels, differential actuators operable to register additively or alternatively subtractively upon said dividend register, and a quotient register; quotient registration control means including value responsive means adjustable to different positions in accordance with the presence of a positive or alternatively of a negative registration in the dividend register, control means invariably settable by said value responsive means as given dividend numeral wheels come approximately to zero registering position to terminate a quotient figure registration, means cooperating with the value responsive means in each shifted position of the carriage, including elements operable to initiate subtractive registering action of the actuators when the registration is positive, and elements operable to initiate additive registering action thereof when the registration is negative, and means operable in one extreme shifted position of the carriage to disable the subtraction initiating elements.

18. In a calculating machine having a transversely shiftable carriage, a dividend register mounted thereon and including numeral wheels, differential actuators operable to register additively or alternatively subtractively upon said dividend register, divisor entering means, and a quotient register; quotient registration control means including value responsive means having elements individual to the numeral wheels, a cut-off element operable to disable the individual elements related to wheels located to the right of the highest order divisor digit, control means invariably settable by said value responsive means as the numeral wheels to the left of the cut-off element come approximately to zero registering position to terminate a quotient figure registration, means cooperating with the value responsive means in each shifted position of the carriage to initiate subtractive registering action of the actuators when the registration is positive and to initiate additive registering action thereof when the regstration is negative, and means operable in one extreme shifted position of the carriage to disable the cut-off element.

19. In a calculating machine having a transversely shiftable carriage, a register mounted thereon, differential actuators operable to register additively or alternatively subtractively upon said register, and carriage shifting means; value responsive means adjustable to different positions in accordance with the presence of a positive or alternatively of a negative registration in the register, means driven by the carriage shifting means and controlled by the value responsive means to initiate subtractive registering action of the actuators when the registration is positive and to initiate additive registering action thereof when the registration is negative, an operation key, and means for initiating a carriage shift upon manual operation of said key.

20. In a calculating machine having a transversely shiftable carriage, a register mounted thereon, differential actuators operable to register additively or alternatively subtractively upon said register, and carriage shifting means; value responsive means adjustable to different positions in accordance with the presence of a positive or alternatively of a negative registration in the register, means driven by the carriage shifting means and controlled by the value responsive means to initiate subtractive registering action of the actuators when the registration is positive and to initiate additive registering action thereof when the registration is negative, actuator stopping means controlled by the value responsive means, means operable by the stopping means to initiate a carriage shift, an operation key, and means for initiating a carriage shift upon manual operation of said key.

21. In a calculating machine having a transversely shiftable carriage, a register mounted thereon and comprising numeral wheels and crawl tens transfer gearing between said wheels, differential actuators operable to register additively or alternatively subtractively upon said register, and carriage shifting means; value responsive means including elements individual to the numeral wheels and adjustable thereby, each to indicate that the related numeral wheel is approximately at zero registering position or alternatively that a positive or a negative value is registered thereon, means operable by the carriage shifting means in successive shifted positions of the carriage to initiate actuator operation, said initiating means including elements adjustable from ineffective to effective initiating position, and control means including elements engageable successively by the value responsive elements and operable when the related numeral wheel stands at substantial value registering position to adjust the actuation initiating elements to effective position, whereby registration controlled by a positive or a negative registered value may proceed from higher to lower orders in such places only wherein the control means is effective upon an actuation initiating element related to a numeral wheel registering a substantial algebraic value.

22. In a calculating machine having a transversely shiftable carriage, a register mounted thereon and comprising numeral wheels and crawl tens transfer gearing between said wheels, differential actuators operable to register additively or alternatively subtractively upon said register, and carriage shifting means; value responsive means including elements individual to the numeral wheels and adjustable thereby each to indicate that the related numeral wheel is approximately at zero registering position or alternatively that a positive or a negative value is registered thereon, a stop adjustable to active position to terminate operation of the carriage shifting means and control means including elements engageable successively by the value responsive elements and operable when the related numeral wheel stands at substantial value registering position to adjust the stop to active position, whereby a continuous carriage shift toward the left may be effected through a plurality of denominational positions wherein the wheels successively related to the control elements stand approximately at zero to bring a value responsive element related to a numeral wheel registering a substantial positive or negative value into engagement with the control elements.

23. In a calculating machine having a transversely shiftable carriage, a register mounted thereon and including numeral wheels, settable differential actuators operable to register additively or alternatively subtractively upon said register, and carriage shifting means; transmission means between the actuators and the register adapted to provide for a registering movement of said actuators and simultaneous shifting of said carriage; value responsive means including elements individual to the numeral wheels, control means invariably settable by said value responsive means as an algebraically registered value in given numeral wheels is reduced approximately to zero to initiate operation of the carriage shifting means, and cooperating control means controlled by said value responsive means to terminate a carriage shift when a numeral wheel registering an algebraic value substantially greater than zero is shifted to the limit of its driving relation with the highest order set actuator.

24. In a calculating machine having a transversely shiftable carriage, a register mounted thereon, differential actuators for said register, and carriage shifting means; transmission means between the actuators and the register adapted to provide for a registering movement of said actuators and simultaneous shifting of said carriage, means for initiating a carriage shifting operation, and means controlled by the register and operable by the shifting means during the first part of the shifting movement thereof to initiate actuator operation.

25. In a calculating machine having a transversely shiftable carriage, a register mounted thereon, differential actuators for said register, and carriage shifting means; transmission means between the actuators and the register adapted to provide for a registering movement of said actuators and simultaneous shifting of said carriage, means for initiating a carriage shifting operation, means controlled by the register and operable by the shifting means to initiate actuator operation, and means settable upon initiation of said actuator operation to limit the extent of the shifting movement.

26. In a calculating machine having a transversely shiftable carriage, a register mounted thereon, differential actuators for said register, and carriage shifting means; transmission means between the actuators and the register adapted to provide for a registering movement of said actuators and simultaneous shifting of said carriage, means for terminating a carriage shifting operation, and shift control means controlled by the register and operable in accordance with the condition of the shifting means alternatively to prevent termination of the shifting operation or to restart the shift.

27. In a calculating machine having a fixed frame, a cycle counting register mounted thereon and comprising numeral wheels, a transversely shiftable carriage, a register mounted thereon and comprising numeral wheels, differential actuators for said last named register mounted in said frame, and carriage shifting means; the combination with transmission means between the actuators and the register adapted to provide for a registering movement of said actuators and simultaneous preliminary shifting of said carriage, and means for arresting the actuators and for further shifting the carriage to change the ordinal relation of the actuators and numeral wheels, of cycle counting devices including a series of counting fingers individually related to the numeral wheels of the cycle counting register, means for operating any counting finger during the preliminary shifting movement of the carriage, and a vernier slide to disable all but a selected one of said fingers and operable during the further shifting movement of the carriage to disable the active finger and to enable an adjacent finger.

28. In a calculating machine having a register comprising numeral wheels and crawl tens transfer gearing between said wheels; means for determining the presence of a positive or of a negative value in the register, including electric sign signalling circuits, contacts interposed in said circuits and comprising each individually adjustable pairs of primary and related cooperating secondary elements, and devices individual to the numeral wheels and operable thereby each to adjust the appropriate related primary element into contacting position and the secondary elements of lower order out of contacting position to give a positive or alternatively a differing negative value signal in response to fractional registrations transmitted through the transfer gearing, a member shiftably related to the numeral wheels and settable to adjust certain of the adjusting devices to hold the secondary contact elements to the right of the set member out of contacting position.

29. In a calculating machine having a register comprising numeral wheels; the combination with means for determining the presence of a positive or of a negative value in the register, including a series of devices individual to the numeral wheels and comprising each a cam on the numeral wheel, and two sensing levers alternatively adjusted by the cam, of stops serving to hold the levers out of contact with the low portion of the cam, and springs urging said levers toward the cam and cooperating therewith to locate the related numeral wheel accurately at zero registering position.

30. In a calculating machine having a register comprising numeral wheels and crawl tens transfer gearing between said wheels; means for determining the presence of a positive or of a negative value in the register, including a series of devices individual to the numeral wheels and comprising each a cam on the numeral wheel, a lever positioned by the cam, a pawl carried by the lever, and a hold out member carried by the lever, plus and minus sign indicating bars designed for selective positioning by any one of said pawls in accordance with the position of the related cam, said hold out members and pawls being provided with overlapping lugs operable in the lifting of any hold out member to lift all pawls to the right thereof out of cooperating relation with the sign indicating bars, and cam means operable to lift any hold out member displaced by its lever through the displacement of the related numeral wheel from zero registering position.

31. In a calculating machine having a register comprising numeral wheels and crawl tens transfer gearing between said wheels, and differential actuators operable to register additively or alternatively subtractively upon said register; the combination with means for determining the presence of a positive or of a negative value in the register in accordance with the digital and fractional displacement of the wheels from zero registering position, and means operable by the determining means to change the registering movement transmitted by the actuators to effect a registration of opposite sign, of means operable to adjust the register wheels to align the numeral designations thereof, and means for disabling the aligning means, designed to prevent aligning action thereof throughout the registering movement of the actuators and during the action of the sign changing means.

GEORGE C. CHASE.

CERTIFICATE OF CORRECTION.

Patent No. 2,339,616.  January 18, 1944.

GEORGE C. CHASE.

It is hereby certified that error appears in the printed specification of the above numbered patent requiring correction as follows: Page 3, first column, line 46, after the word "described" insert a comma; page 4, second column, line 57, for "4.75" read --.475--; page 5, first column, line 60, after "position" insert a comma; line 74, after "set" insert a comma; page 6, first column, line 38, for "shaft" read --shift--; line 56, strike out the comma after "operation" and insert the same after the quotation mark in same line; same page, second column, line 74, for "wheel" read --wheels--; page 7, first column, line 54, strike out the words and comma "signed to occur only during division operations,"; and second column, line 58, for "allow" read --allowed--; page 9, first column, line 74, after "wheel" insert --cams--; page 11, second column, line 66, after "held" insert --temporarily--; line 71, for "tinto" read --into--; page 13, first column, line 66, after "230)" insert a comma; and second column, line 1, for "aff" read --off--; page 17, first column, line 70, claim 13, for "registrating" read --registering--; page 18, first column, line 4, claim 16, for "registerng" read --registering--; page 19, first column, line 72, claim 27, after "frame" insert a comma; line 75, same claim, after "for" strike out "a"; and that the said Letters Patent should be read with this correction therein that the same may conform to the record of the case in the Patent Office.

Signed and sealed this 8th day of August, A. D. 1944.

Leslie Frazer (Seal)   Acting Commissioner of Patents.